(12) United States Patent
Terashima

(10) Patent No.: US 10,983,287 B2
(45) Date of Patent: Apr. 20, 2021

(54) CONNECTION DETECTING MECHANISM OF OPTICAL CONNECTOR PLUG

(71) Applicant: SANWA DENKI KOGYO CO., LTD., Tokyo (JP)

(72) Inventor: Tomoya Terashima, Tokyo (JP)

(73) Assignee: SANWA DENKI KOGYO CO., LTD., Tokyo (JP)

( * ) Notice: Subject to any disclaimer, the term of this patent is extended or adjusted under 35 U.S.C. 154(b) by 0 days.

(21) Appl. No.: 16/538,874

(22) Filed: Aug. 13, 2019

(65) Prior Publication Data
US 2020/0088949 A1    Mar. 19, 2020

(30) Foreign Application Priority Data

Sep. 14, 2018     (JP) ............................. JP2018-172334

(51) Int. Cl.
     *G02B 6/38*      (2006.01)

(52) U.S. Cl.
     CPC ............ *G02B 6/385* (2013.01); *G02B 6/3825* (2013.01); *G02B 6/3895* (2013.01); *G02B 6/3877* (2013.01)

(58) Field of Classification Search
     CPC .................................................. G02B 6/3895
     See application file for complete search history.

(56) References Cited

U.S. PATENT DOCUMENTS

| | | | |
|---|---|---|---|
| 4,496,213 A | 1/1985 | Borsuk | |
| 6,375,362 B1* | 4/2002 | Heiles | G02B 6/3827 385/135 |
| 6,511,231 B2* | 1/2003 | Lampert | G02B 6/3825 385/70 |
| 7,374,101 B2* | 5/2008 | Kaneko | G06K 7/10178 235/492 |
| 8,406,597 B2* | 3/2013 | Case | G02B 6/3825 385/134 |
| 9,885,841 B2* | 2/2018 | Pepe | G02B 6/3893 |
| 10,571,641 B2* | 2/2020 | Petersen | G02B 6/43 |
| 2004/0105325 A1 | 6/2004 | Sago et al. | |

(Continued)

FOREIGN PATENT DOCUMENTS

| | | | |
|---|---|---|---|
| JP | 4588805 B1 | 12/2010 | |
| JP | 4685972 B1 | 5/2011 | |

(Continued)

OTHER PUBLICATIONS

Extended European Search Report in corresponding European Application No. 19192536.1, dated Jan. 16, 2020.

*Primary Examiner* — Michelle R Connelly
(74) *Attorney, Agent, or Firm* — Bacon & Thomas, PLLC

(57) ABSTRACT

An optical connection detecting device has in a front face thereof a light emission display portion for detecting an optical connection, and in both front and rear ends of a lower face thereof a switch lever for detecting the optical connection. In an optical adapter, ferrule leading end portions of optical connector plugs inserted from fitting portions in both ends are butt jointed, leading ends of the switch levers in both front and rear ends of the optical connection detecting device are faced to notch concave portions which are formed in upper wall sides of opening ends of both the fitting portions of the optical adapter. When the optical connector plug is fully inserted into the fitting portion of the optical adapter instead of being in a half-inserted state, the switch lever is pushed up and the light emission display portion is displayed with an on-state lighting color.

2 Claims, 26 Drawing Sheets

(56) References Cited

U.S. PATENT DOCUMENTS

| | | | |
|---|---|---|---|
| 2005/0196120 A1* | 9/2005 | Colombo | G02B 6/4452 385/135 |
| 2010/0120264 A1* | 5/2010 | Caveney | H04Q 1/136 439/49 |
| 2011/0141943 A1* | 6/2011 | Shifris | H04Q 1/136 370/254 |
| 2011/0206335 A1 | 8/2011 | Cook | |
| 2011/0256742 A1* | 10/2011 | Panella | H05K 1/118 439/65 |
| 2013/0076589 A1* | 3/2013 | Caveney | G02B 6/3895 343/906 |
| 2013/0323940 A1* | 12/2013 | Coffey | G02B 6/387 439/38 |
| 2014/0016902 A1* | 1/2014 | Pepe | G02B 6/3893 385/76 |
| 2014/0286610 A1* | 9/2014 | Anderson | G02B 6/3893 385/76 |
| 2015/0060539 A1* | 3/2015 | Thompson | G02B 6/3895 235/375 |
| 2016/0309606 A1* | 10/2016 | Anderson | H04Q 1/03 |
| 2016/0349466 A1* | 12/2016 | Lambourn | G02B 6/3897 |
| 2017/0003459 A1* | 1/2017 | Takeuchi | G02B 6/3821 |
| 2018/0006726 A1* | 1/2018 | Kim | H04B 10/07955 |
| 2018/0136410 A1* | 5/2018 | Takeuchi | G02B 6/3825 |
| 2018/0246283 A1* | 8/2018 | Pepe | F16B 17/00 |
| 2018/0348445 A1* | 12/2018 | Pepe | H01R 12/716 |
| 2019/0025526 A1* | 1/2019 | Raza | G02B 6/3895 |

FOREIGN PATENT DOCUMENTS

| | | | |
|---|---|---|---|
| JP | 6219219 B2 | 10/2017 | |
| JP | 6229549 B2 | 11/2017 | |

* cited by examiner

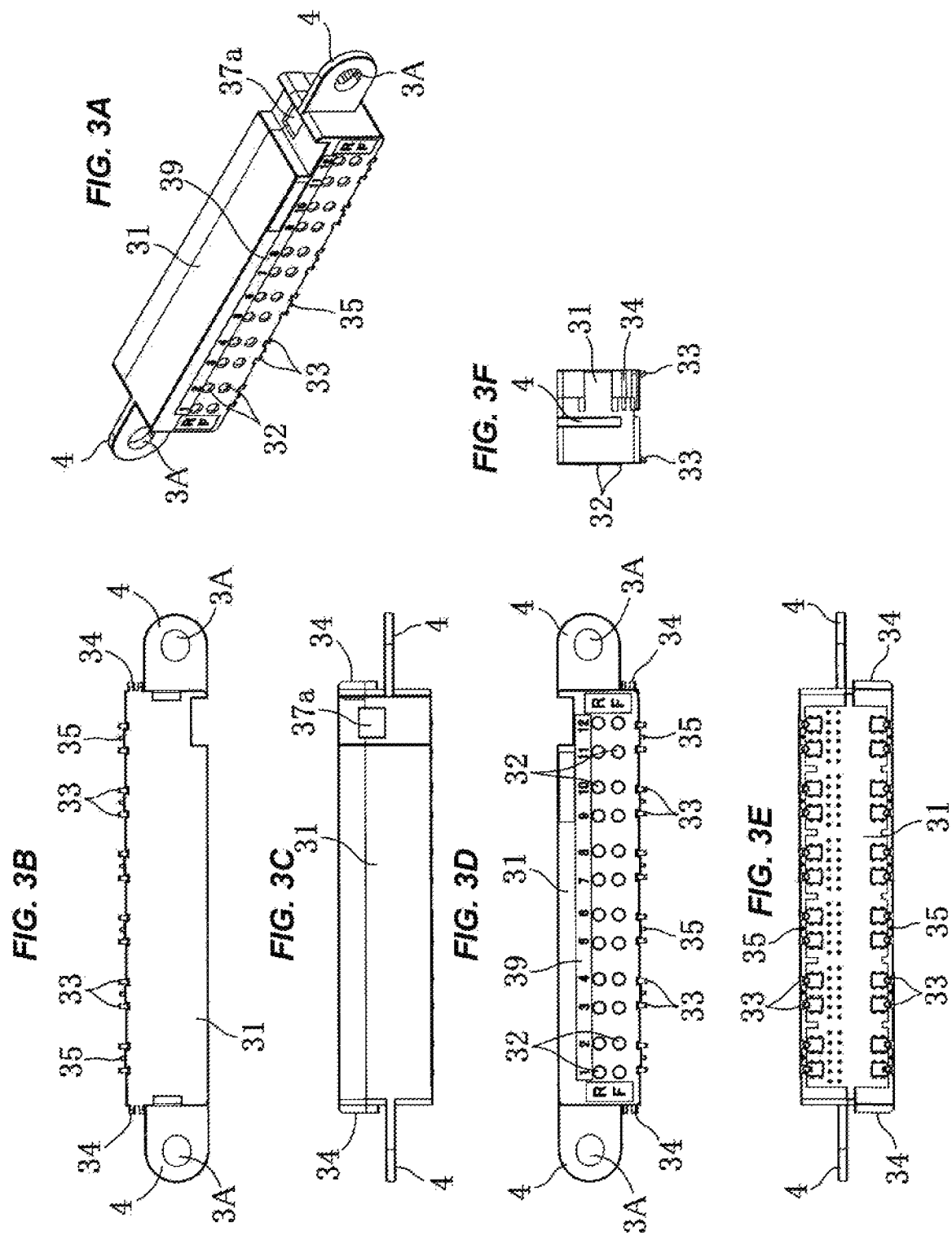

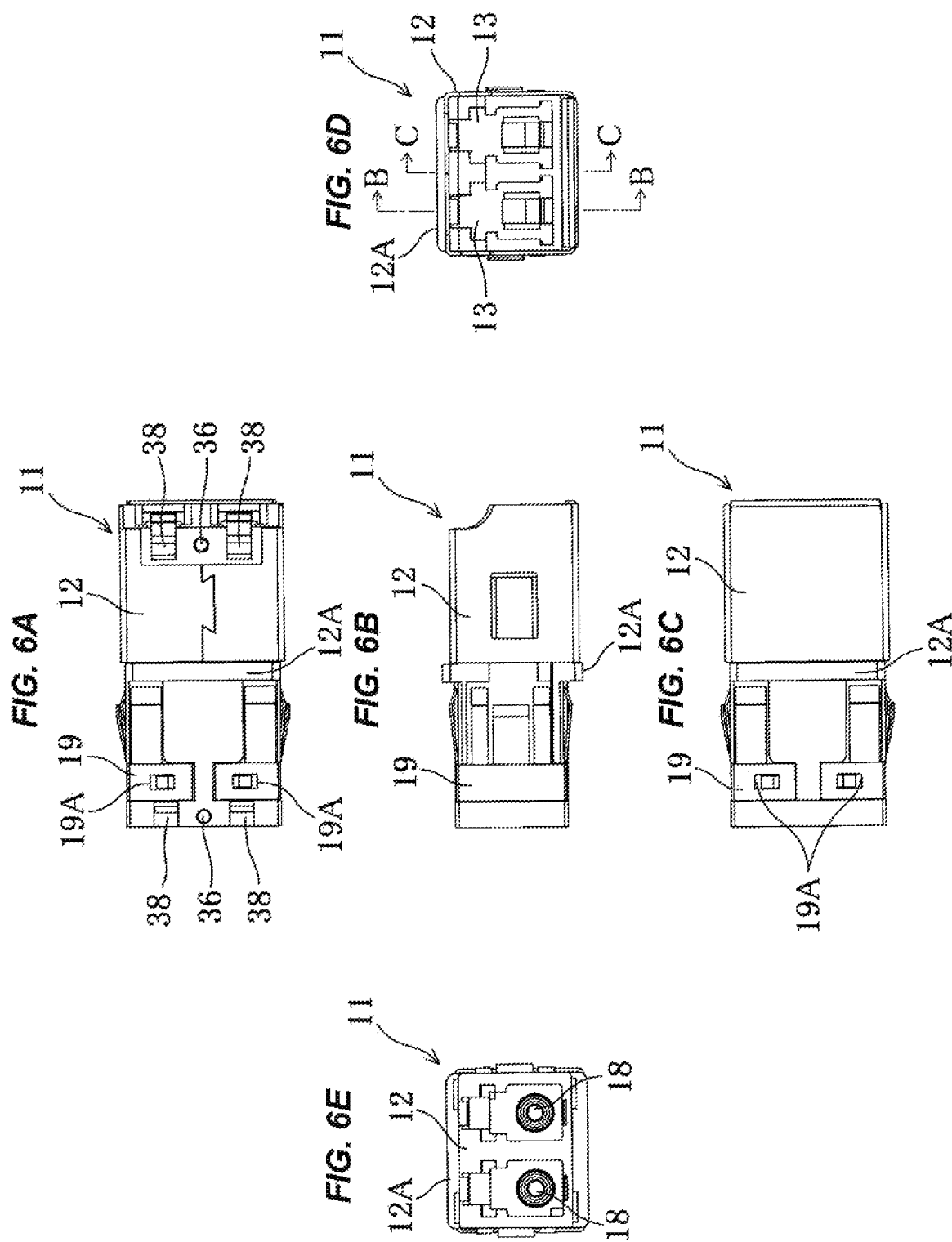

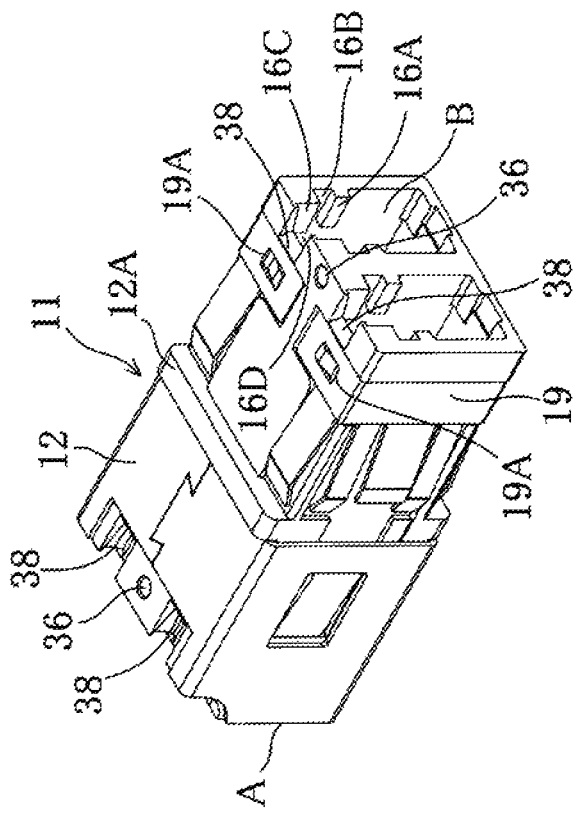
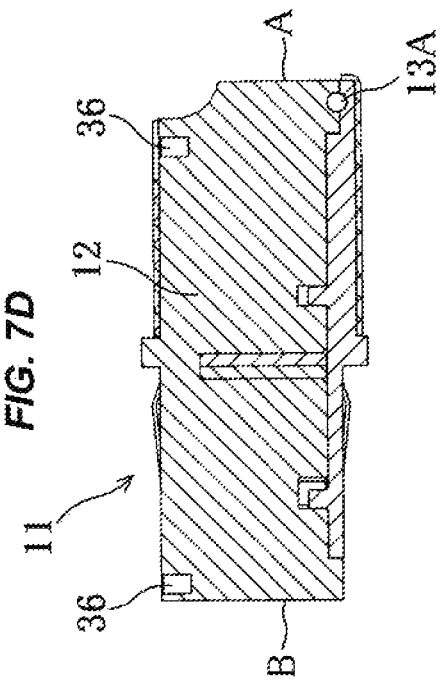
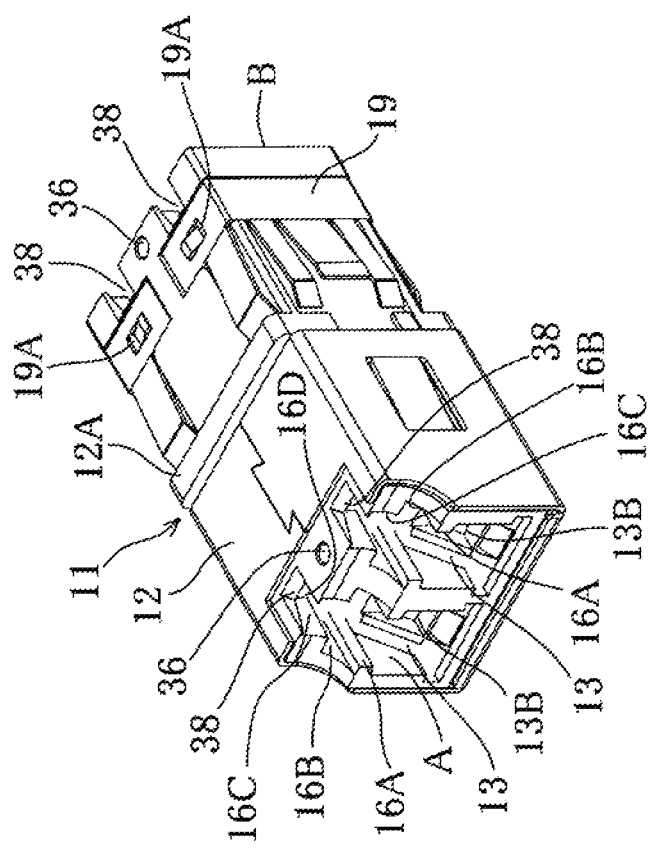
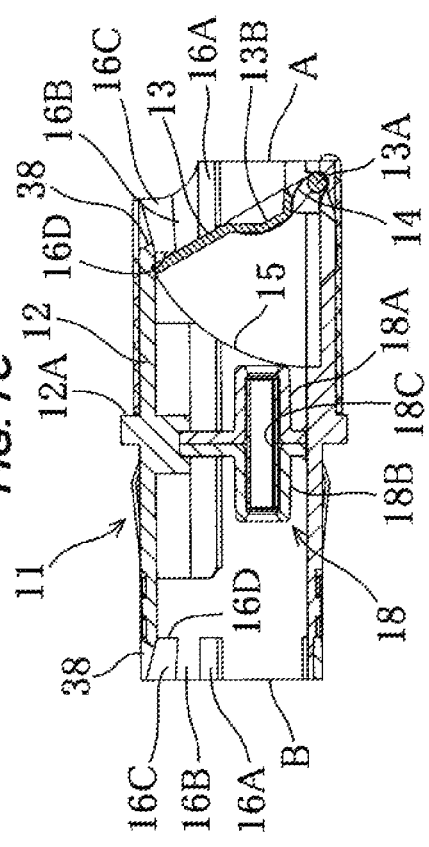

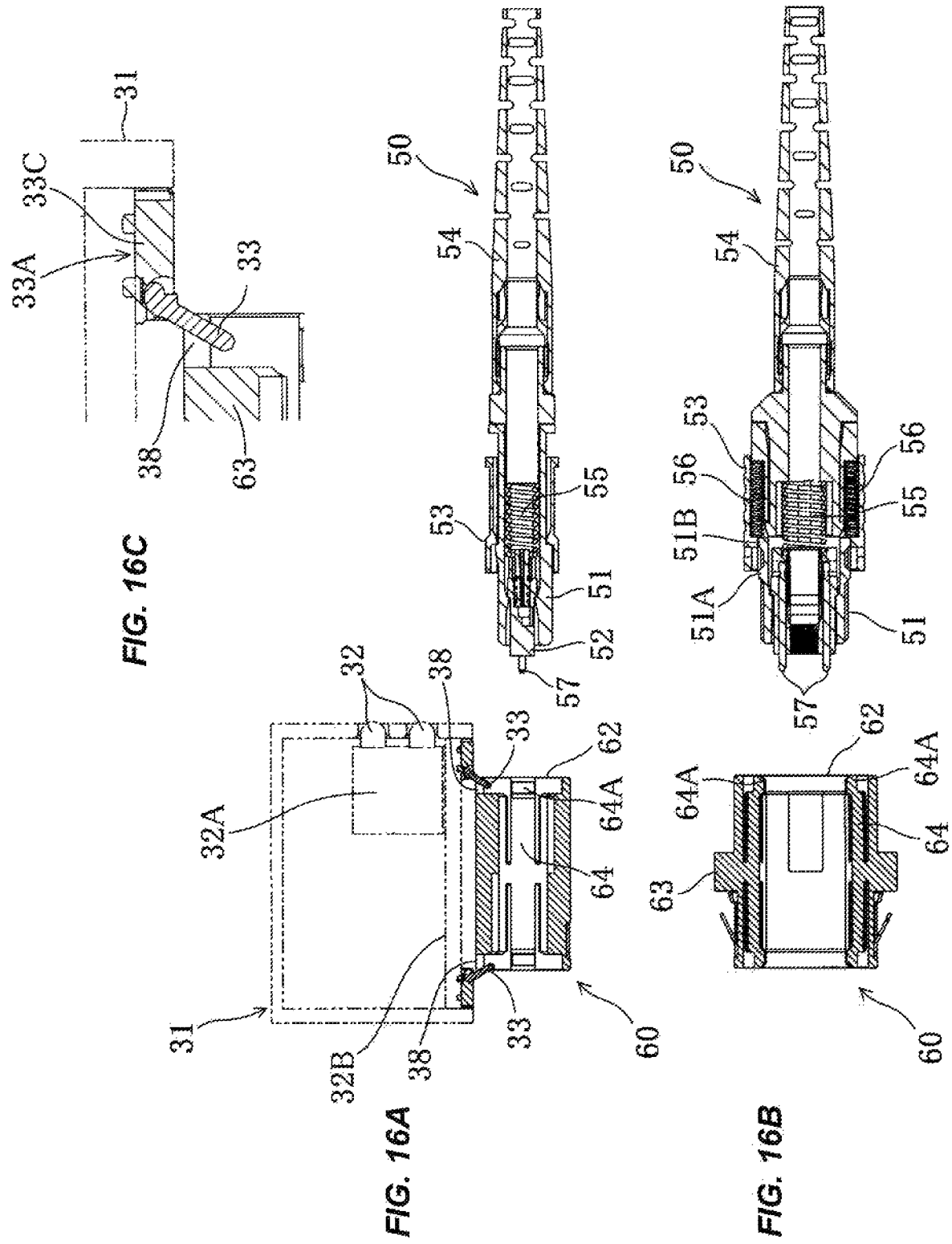

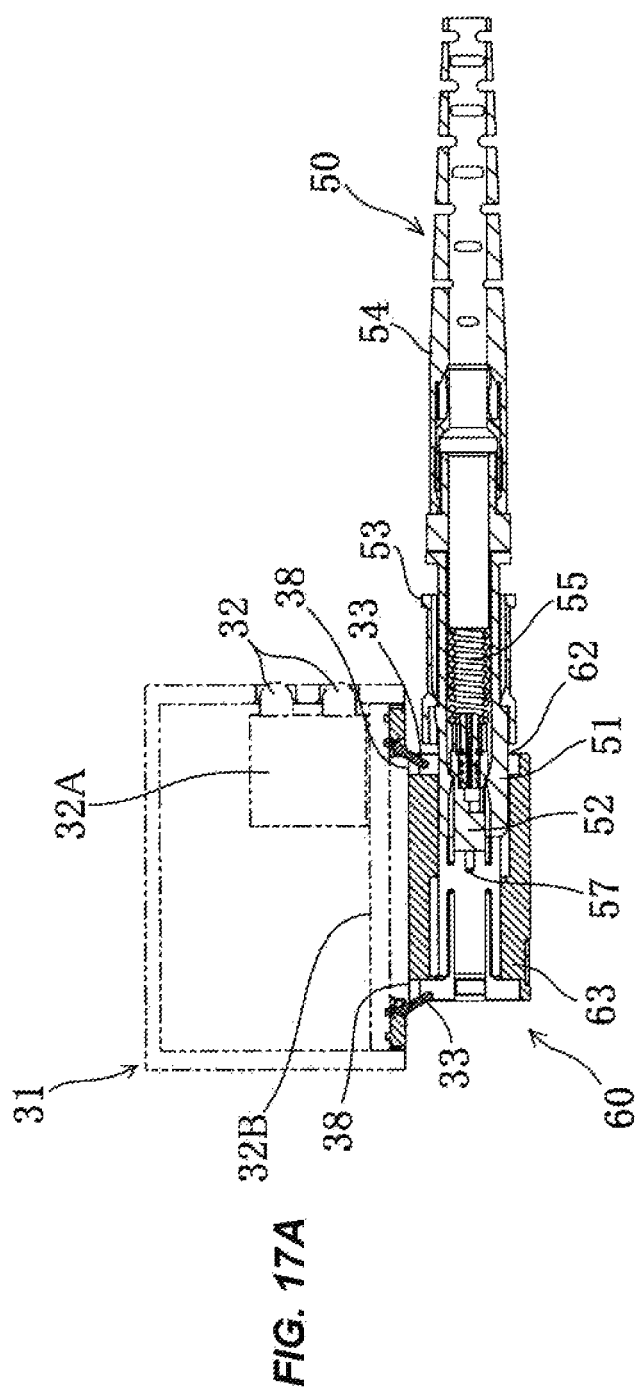
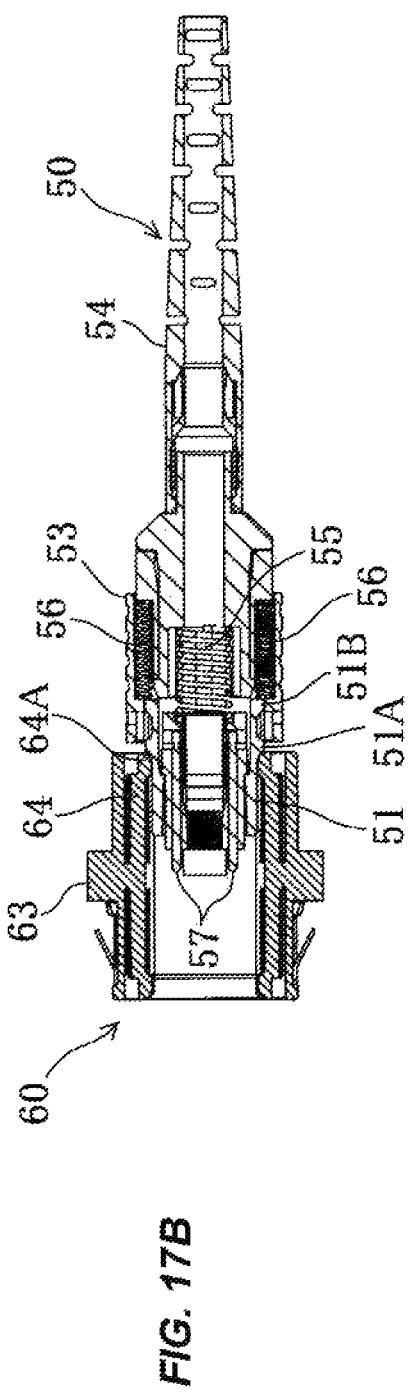
FIG. 17A
FIG. 17B

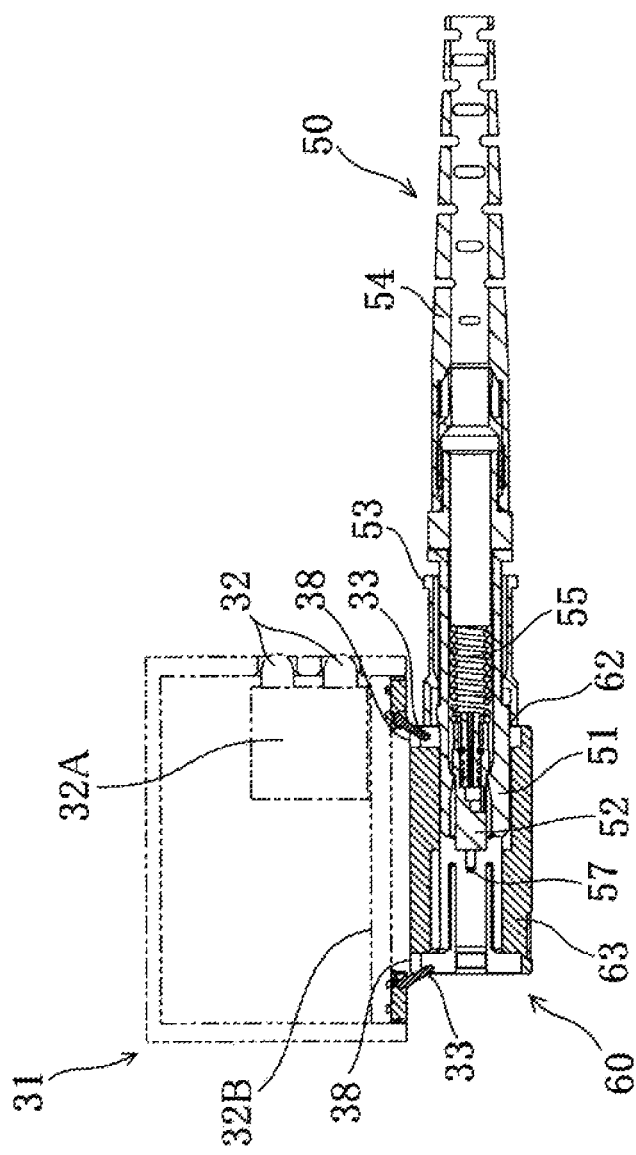
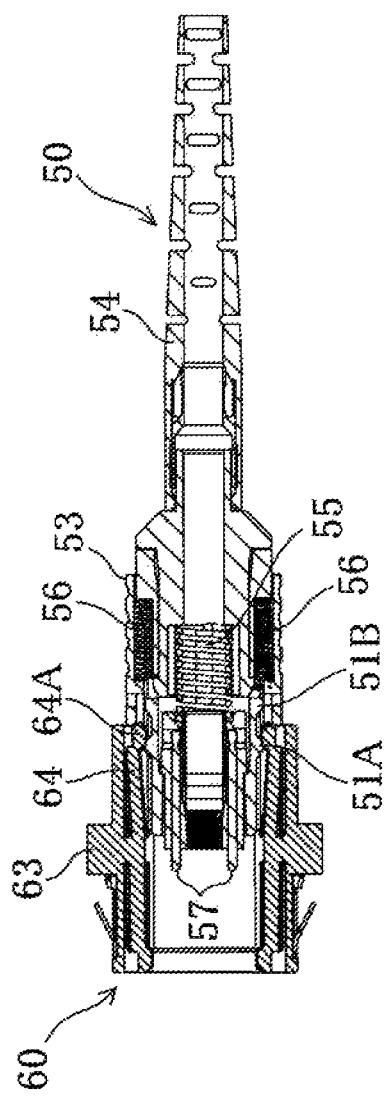
FIG. 18A
FIG. 18B

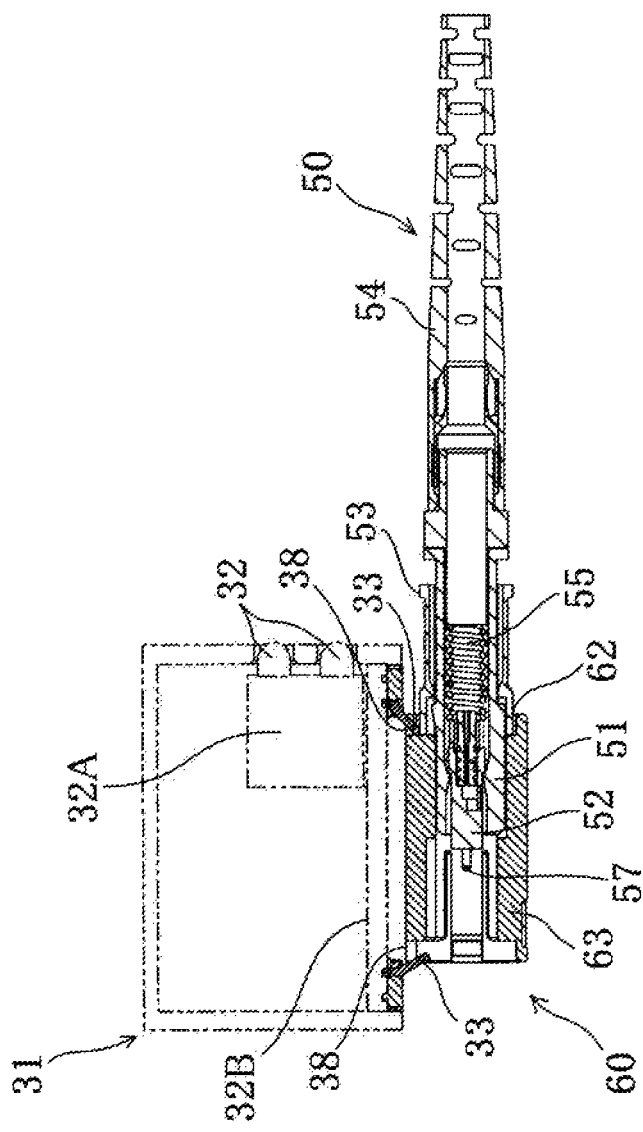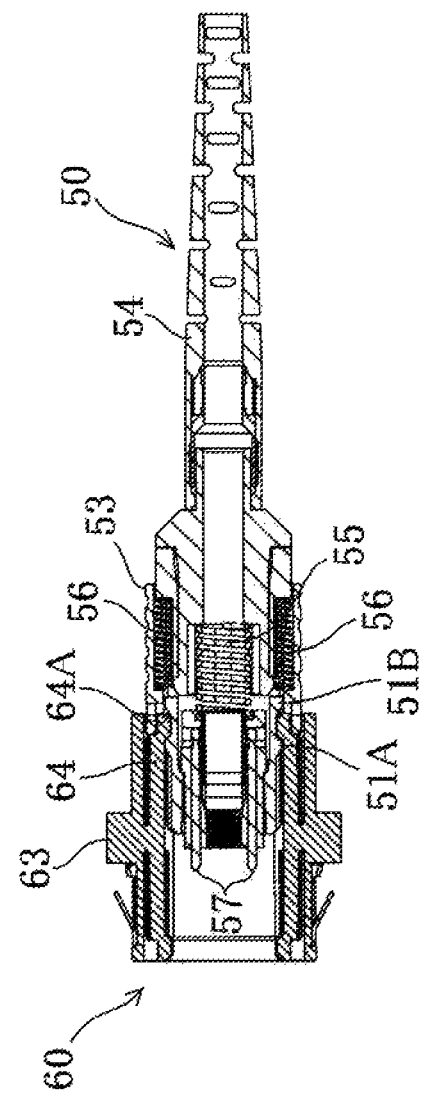
FIG. 19A
FIG. 19B

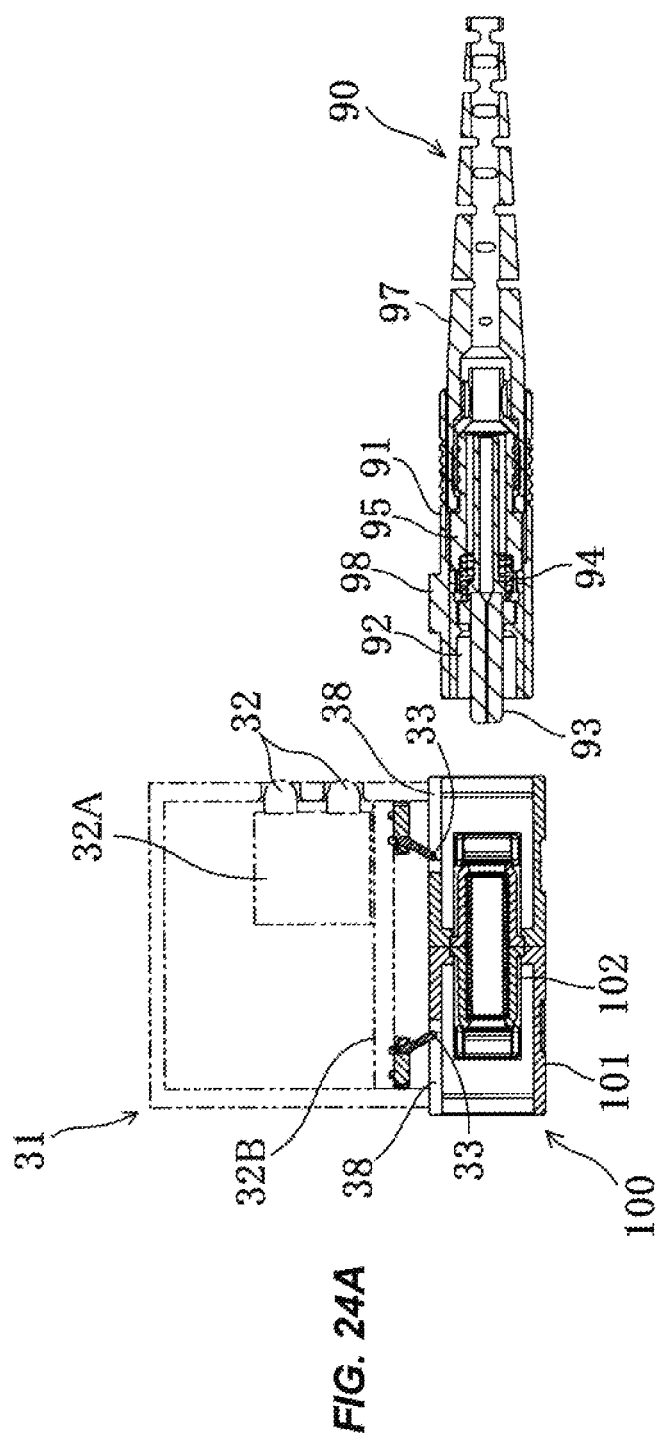
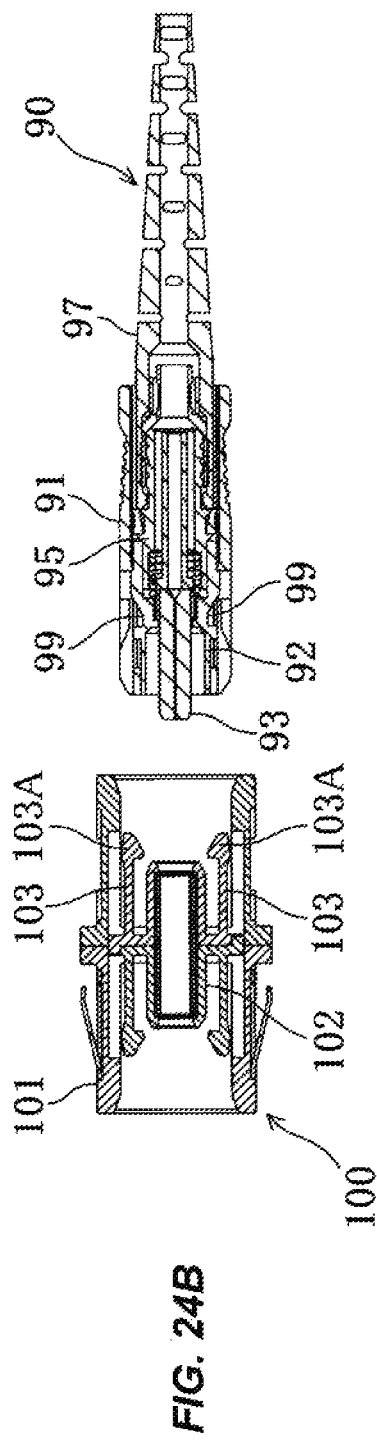
FIG. 24A
FIG. 24B

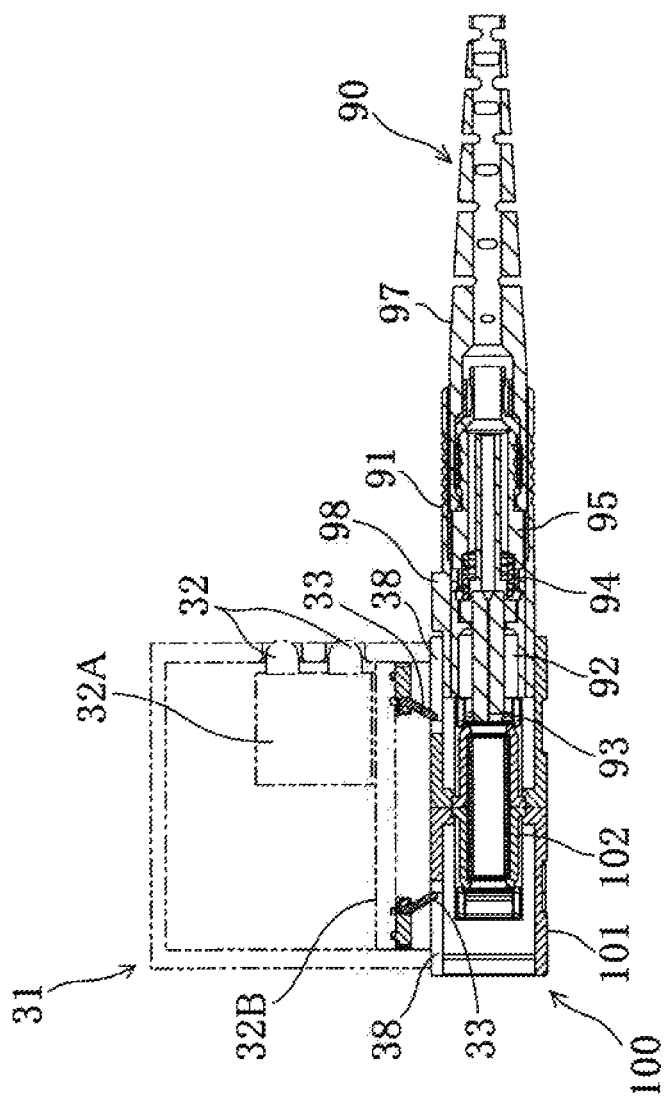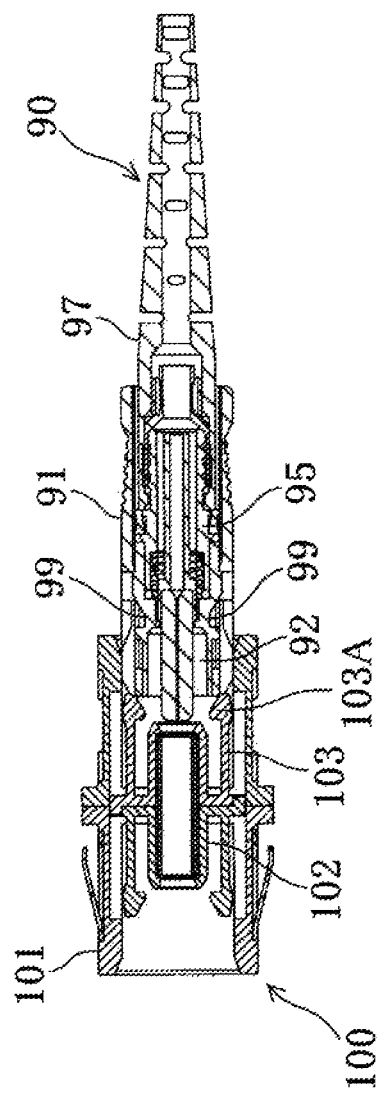
FIG. 25A
FIG. 25B

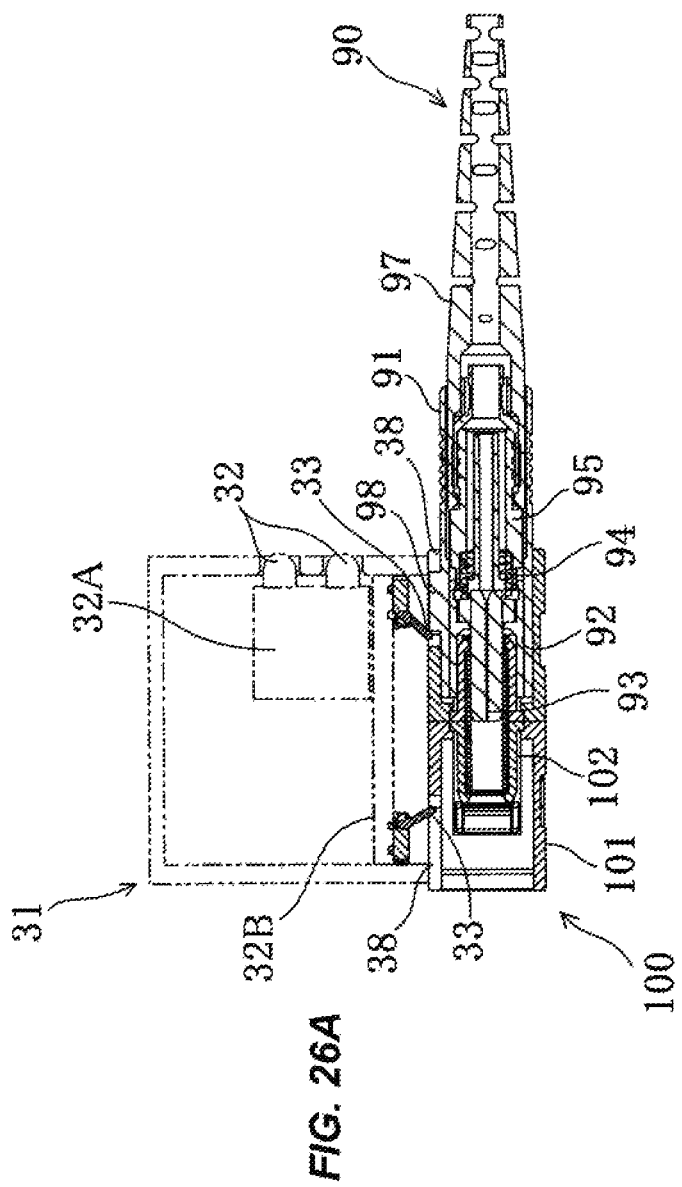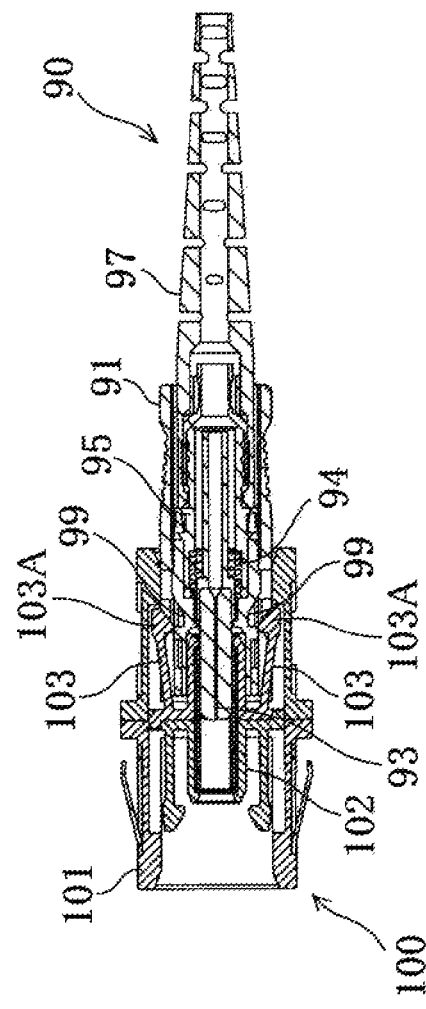

CONNECTION DETECTING MECHANISM OF OPTICAL CONNECTOR PLUG

TECHNICAL FIELD

The present invention relates to a connection detecting mechanism of an optical connector plug which is interconnected by an optical adapter, for example, at the downsized high-density mounting time.

BACKGROUND ART

Conventionally, there have been a lot of connection detecting mechanisms of optical connector plugs which can securely prevent the optical connector plug from being erroneously disconnected from an optical adapter at the normal fitting time as well as previously avoiding a half-inserted state of the optical connector plug when being fitted to the optical adapter.

In particular, as shown in patent literature 1, there is publicly known an optical adapter for coupling an optical connector plug structured such that an adapter sleeve and an adapter latch are provided within an adapter main body, an optical connector plug having a ferrule is inserted into the adapter main body, and a head portion of the adapter latch gets over a head portion of the connector latch or the head portion and a plate-like portion of the connector latch and is engaged with the connector latch, thereby connecting the optical connector plug, being rotated around a connection element rotation supporting point and a rotary display portion rotation supporting point by a lifting motion of the head portion of the adapter latch, and rotationally amplifying an amount of lifting motion of the adapter latch. As a result, the rotary display portion is rotated by a connection element and the optical adapter displays on the rotary display surface a half-inserted state when the adapter latch runs on the connector latch or the plate-like portion with an operating amount of the rotational amplification.

Further, as shown in patent literature 2, there is publicly known an optical adapter for coupling an optical connector plug structured such that a head portion of an optical adapter latch of the optical adapter is lifted up by a head portion of an optical connector latch when the optical connector plug is inserted into the optical adapter, and comes into contact with each other in their head portion leading ends without the head portion of the optical adapter latch engaging with the head portion of the optical connector latch, and both the latches are at a half insertion state position which is different from a position where both the latch are engaged, thereby mechanically rotating and amplifying an amount of lifting motion of the adapter latch and displaying a position of the amplified amount of motion.

Further, as shown in patent literature 3, there is publicly known an adapter for detecting communication light for a duplex LC including a first light extraction hole in which a first optical transmission line is arranged among two optical transmission lines of which a part of communication light is taken out as leakage light when the duplex LC connector is fitted ad inserted, and which takes the leakage light out of a first space which is comparted by a first wall surface and is isolated from the other space, a second light extraction hole in which a second optical transmission line is arranged among the two optical transmission lines and which takes the leakage light out of a second space which is comparted by a second wall surface and is isolated from the other space, the first light extraction hole and the second light extraction hole being provided on an upper wall surface of an adapter main body which is opaque against the light, and a communication light detector having a first light receiving element which is fitted and attached to the first light extraction hole, and a second light receiving element which is fitted and attached to the second light extraction hole, wherein the first light extraction hole and the second light extraction hole are formed by the same through hole, a partition wall comparting between the first space and the second space is constructed by a light receiving substrate in which the first light receiving element is mounted on one surface thereof, and the second light receiving element is mounted on the other surface thereof.

Further, as shown in patent literature 4, there is publicly known a communication light detector attached via an attachment to a light extraction hole which is formed in an upper wall surface of a communication light visualization adapter, receiving through the light extraction hole the leakage light which a part of the communication light transmitted via the communication light visualization adapter is taken out of, and provided in an upper surface of a display portion with a pilot lamp for detecting whether or not the communication light is transmitted via the communication light visualization adapter.

CITATION LIST

Patent Literature

PATENT LITERATURE 1: Japanese Patent No. 4685972
PATENT LITERATURE 2: Japanese Patent No. 4588805
PATENT LITERATURE 3: Japanese Patent No. 6219219
PATENT LITERATURE 4: Japanese Patent No, 6229549

SUMMARY OF THE INVENTION

Technical Problem

However, in the patent literature 1 and the patent literature 2 mentioned above, since a poor connection caused by a half insertion between the optical connector plugs is displayed by a mechanical motion of the rotary display portion, there is a fear that a rotational trouble is frequently generated.

Further, in the case of the patent literature 2, since the surface displaying the position of amount of motion is arranged upward, it is hard to view the display from the front face in a downsized high-density mounting optical adapter a lot of which are overlapped in a vertical direction.

Further, in the patent literature 3 mentioned above, since the communication light detector is provided in an upper wall surface of the adapter main body, the communication light detector being constructed by the first light extraction hole which takes out the leakage light from the first space, and the second light extraction hole which takes out the leakage light from the second space, it is hard to view from the front face of the communication light detector in the downsized high-density mounting optical adapter a lot of which are overlapped in the vertical direction.

Further, in the patent literature 4 mentioned above, since the pilot lamp is arranged on the upper surface of the display portion of the communication light detector which is attached to the light extraction hole via the attachment, it is hard to view the pilot lamp from the front face in the downsized high-density mounting optical adapter a lot of which are overlapped in the vertical direction.

Further, the rotary display portions of the patent literature 1 and the patent literature 2 mentioned above are individually provided in each of the optical adapters, and the communication light detectors of the patent literature 3 and the patent literature 4 are individually attached to each of the optical adapters. As a result, it is very troublesome to install the rotary display portion and attach the communication light detector to each of all the optical adapters and it takes a lot of trouble.

Further, in the communication light detector of the patent literature 3, the light reflection layer and the position adjusting groove are provided, and in the communication light detector of the patent literature 4, the light receiving element is provided. As a result, a complicated structure is required, and a product cost and a manufacturing cost are expensive.

Accordingly, the present invention is made by taking into consideration the conventionally existing various circumstances as mentioned above, and an object of the present invention is to provide a connection detecting mechanism of an optical connector plug in an optical adapter which can be mounted in a downsized high-density manner, in which the connection detecting mechanism of the optical connector plug can resolve the conventional troublesome work of individually attaching the detecting device to the optical adapter by structuring such as to easily confirm visually from a front face side of the optical adapter whether or not the optical connector plug is in a half-inserted state, prevent the poor connection accident from being generated in all the optical adapter, and attach a connection detecting device according to a single configuration so as to be used in common over all the optical adapter which are adjacent in a lateral direction.

Solution to Problem

In order to achieve the object mentioned above, according to the present invention, there is provided a connection detecting mechanism of an optical connector including:

a connection detecting device which is provided in a front face thereof with a light emission display portion for detecting connection and in a lower face with a switch lever for detecting connection; and an optical adapter which is provided in both ends with fitting portions of the optical connector plug so that optical axes coincide with each other, and butt joints in an inner portion thereof ferrule leading end portions of the optical connector plug inserted from the fitting portions in both ends.

wherein the switch lever in the lower face of the connection detecting device faces in a leading end thereof to a notch concave portion which is formed in an upper wall side of an opening end of the fitting portion in the optical adapter, and wherein the switch lever is pushed up from a switch-off state to a switch-on state when the optical connector plug is fully inserted to the fitting portion of the optical adapter instead of being in a half-inserted state, and a lighting color of the on-state is displayed on a light emission display portion in the front face.

The connection detecting device is formed an outer shape thereof into a rectangular housing shape, and is provided in both front and rear ends of the lower face with the switch lever for detecting connection, and the light emission display portion in the front face of the connection detecting device is formed as a pair of light emission display portions in upper and lower positions in correspondence to the fitting portions in both ends of the optical adapter.

An optical adapter panel is provided in such a manner as to arrange side by side and mount a plurality of the optical adapters, an attaching recess having approximately the same width as a length of the connection detecting device is provided in the optical adapter panel in such a manner that the connection detecting device is arranged in an upper side of the optical adapter, and the light emission display portions in the front face of the connection detecting device are formed side by side in the upper and lower positions in correspondence to the fitting portions in both ends of each of the optical adapters.

Horizontal guide keys are provided in both right and left side faces of the connection detecting device, a screw attaching flange portion for fixing to the optical adapter panel is provided at a position which is away from the guide keys, and guide grooves for inserting the guide keys from a forward side of the optical adapter panel are formed at opposing positions of right and left inner edges in the attaching recess of the optical adapter panel.

Downward projections are provided in both front and rear ends of the lower face of the connection detecting device, hole portions are provided in upper wall sides of opening ends in both the fitting portions of the optical adapter, and the projections and the hole portions are formed in such a manner as to position the optical adapter in relation to the connection detecting device by moving downward the connection detecting device in relation to the optical adapter panel in a state in which the connection detecting device is locked by the screw attaching flange portion, and fitting the projections to the hole portions.

The optical connector plug is an LC-type optical connector plug in which a latch lever detachably engaging with the optical adapter is formed in an upper surface in a longitudinal direction of the optical connector plug from a forward side toward a rearward side, the latch lever pushes up a switch lever of the connection detecting device so as to change from a switch-off state to a switch-on state when the optical connector plug is fully inserted into the fitting portion of the optical adapter instead of being in a half-inserted state, and the optical connector plug is formed in such a manner that a lighting color of the on-state is displayed on a light emission display portion in the front face.

The optical connector plug is an MPO-type optical connector plug having a tubular coupling which is outward inserted into a sleeve-shaped housing having a ferrule housed in a leading end thereof and is provided slidably in a movable range which is secured in an axial direction of the housing, the coupling pushes up a switch lever of the connection detecting device so as to change from a switch-off state to a switch-on state when the optical connector plug is fully inserted into the fitting portion of the optical adapter instead of being in a half-inserted state, and the optical connector plug is formed in such a manner that a lighting color of the on-state is displayed on a light emission display portion in the front face.

The optical connector plug is an MU-type optical connector plug structured such that a knob is outward installed to an outer side of a plug frame and the plug frame can slide at a desired stroke in an axial direction within the know, the knob pushes up a switch lever of the connection detecting device so as to change from a switch-off state to a switch-on state when the connector plug is fully inserted into the fitting portion of the optical adapter instead of being in a half-inserted state, and the optical connector plug is formed in such a manner that a lighting color of the on-state is displayed on a light emission display portion in the front face.

The optical connector plug is an SC-type optical connector plug in which a ferrule is inward installed within a plug frame attached to an inner portion of a knob, a guide projection formed in the center of an upper surface of the knob pushes up a switch lever of the connection detecting device so as to change from a switch-off state to a switch-on state when the optical connector plug is fully inserted into the fitting portion of the optical adapter instead of being in a half-inserted state, and the optical connector plug is formed in such a manner that a lighting color of the on-state is displayed on a light emission display portion in the front face.

Effect of Invention

According to the present invention, in the optical adapter which can be mounted in a downsized high-density manner, it is possible to resolve the conventional troublesome work of individually attaching the detecting device to the optical adapter by structuring such as to easily confirm visually from the front face side of the optical adapter whether or not the optical connector plug is in the half-inserted state, prevent the poor connection accident from being generated in all the optical adapter, and attach the connection detecting device according to the single configuration so as to be used in common over all the optical adapter which are adjacent in the lateral direction. As a result, it is possible to construct various plug security systems which are excellent in convenience.

More specifically, the present invention includes:

the connection detecting device which is provided in the front face thereof with the light emission display portion for detecting connection and in the lower face with the switch lever for detecting connection; and the optical adapter which is provided in both ends with the fitting portions of the optical connector plug so that the optical axes coincide with each other, and butt joints in the inner portion thereof the ferrule leading end portions of the optical connector plug inserted from the fitting portions in both ends;

the switch lever in the lower face of the connection detecting device faces in the leading end thereof to the notch concave portion which is formed in the upper wall side of the opening end of the fitting portion in the optical adapter, and the switch lever is pushed up from the switch-off state to the switch-on state when the optical connector plug is fully inserted to the fitting portion of the optical adapter instead of being in the half-inserted state, and the lighting color of the on-state is displayed on the light emission display portion in the front face. As a result, in the optical adapter which can be mounted in the downsized high-density mounting manner, it is possible to securely view from the front face of the optical adapter whether or not the optical connector plug is in the half-inserted state.

The connection detecting device is formed the outer shape thereof into the rectangular housing shape, and is provided in both front and rear ends of the lower face with the switch lever for detecting connection, and the light emission display portion in the front face of the connection detecting device is formed as the pair of light emission display portions in the upper and lower positions in correspondence to the fitting portions in both ends of the optical adapter. As a result, it is possible to simultaneously view from the front face of the optical adapter whether or not the optical connector plug inserted into each of the fitting portions in both ends of the optical adapter is in the half-inserted state.

The optical adapter panel is provided in such a manner as to arrange side by side and mount the plurality of the optical adapters, the attaching recess having approximately the same width as the length of the connection detecting device is provided in the optical adapter panel in such a manner that the connection detecting device is arranged in the upper side of the optical adapter, and the light emission display portions in the front face of the connection detecting device are formed side by side in the upper and lower positions in correspondence to the fitting portions in both ends of each of the optical adapters. As a result, it is possible to simultaneously view whether or not any of the optical connector plugs respectively inserted into the fitting portions in both ends of the optical adapter is in the half-inserted state, by viewing from the front face the light emission display portions which are arranged side by side in the lateral direction in the upper and lower sides of the connection detecting device, and it is possible to prevent the poor connection accident of the optical connector plug from being generated.

The horizontal guide keys are provided in both the right and left side faces of the connection detecting device, the screw attaching flange portion for fixing to the optical adapter panel is provided at the position which is away from the guide keys, and the guide grooves for inserting the guide keys from the forward side of the optical adapter panel are formed at the opposing positions of the right and left inner edges in the attaching recess of the optical adapter panel. As a result, it is possible to easily position the connection detecting device in the width direction in relation to the optical adapter panel by inserting the guide key into the guide groove, and it is possible to securely attach the connection detecting device to the attaching recess in the horizontal state.

The downward projections are provided in both the front and rear ends of the lower face of the connection detecting device, the hole portions are provided in the upper wall sides of the opening ends in both the fitting portions of the optical adapter, and the projections and the hole portions are formed in such a manner as to position the optical adapter in relation to the connection detecting device by moving downward the connection detecting device in relation to the optical adapter panel in a state in which the connection detecting device is locked by the screw attaching flange portion, and fitting the projections to the hole portions. As a result, it is possible to securely integrate the connection detecting device and the optical adapter, and it is possible to appropriately arrange the leading end side of the switch lever of the connection detecting device within the notch concave portion of the optical adapter.

The optical connector plug is the LC-type optical connector plug in which the latch lever detachably engaging with the optical adapter is formed in the upper surface in the longitudinal direction of the optical connector plug from the forward side toward the rearward side, the latch lever pushes up the switch lever of the connection detecting device so as to change from the switch-off state to the switch-on state when the optical connector plug is fully inserted into the fitting portion of the optical adapter instead of being in the half-inserted state, and the optical connector plug is formed in such a manner that the lighting color of the on-state is displayed on the light emission display portion in the front face. As a result, it is possible to simultaneously confirm whether or not the LC-type optical connector plugs each having the single core, two cores or four cores and inserted into the fitting portions in both ends of the optical adapter are in the half-inserted state, by viewing the light emission display portion from the front face, and it is possible to prevent the poor connection accident of the LC-type optical connector plug from being generated. Further, it is possible to easily detect even in a case where the latch lever is broken and the switch lever can not be pushed up.

The optical connector plug is the MPO-type optical connector plug having the tubular coupling which is outward inserted into the sleeve-shaped housing having the ferrule housed in the leading end thereof and is provided slidably in the movable range which is secured in the axial direction of the housing, the coupling pushes up the switch lever of the connection detecting device so as to change from the switch-off state to the switch-on state when the optical connector plug is fully inserted into the fitting portion of the optical adapter instead of being in the half-inserted state, and the optical connector plug is formed in such a manner that the lighting color of the on-state is displayed on the light emission display portion in the front face. As a result, it is possible to simultaneously confirm whether or not the MPO-type optical connector plugs each inserted into the fitting portions in both ends of the optical adapter are in the half-inserted state, by viewing the light emission display portion from the front face, and it is possible to prevent the poor connection accident of the MPO-type optical connector plug from being generated.

The optical connector plug is the MU-type optical connector plug structured such that the knob is outward installed to the outer side of the plug frame and the plug frame can slide at the desired stroke in the axial direction within the know, the knob pushes up the switch lever of the connection detecting device so as to change from the switch-off state to the switch-on state when the connector plug is fully inserted into the fitting portion of the optical adapter instead of being in the half-inserted state, and the optical connector plug is formed in such a manner that the lighting color of the on-state is displayed on the light emission display portion in the front face. It is possible to simultaneously confirm whether or not the MU-type optical connector plugs each inserted into the fitting portions in both ends of the optical adapter are in the half-inserted state, by viewing the light emission display portion from the front face, and it is possible to prevent the poor connection accident of the MU-type optical connector plug from being generated.

The optical connector plug is the SC-type optical connector plug in which the ferrule is inward installed within the plug frame attached to the inner portion of the knob, the guide projection formed in the center of the upper surface of the knob pushes up the switch lever of the connection detecting device so as to change from the switch-off state to the switch-on state when the optical connector plug is fully inserted into the fitting portion of the optical adapter instead of being in the half-inserted state, and the optical connector plug is formed in such a manner that the lighting color of the on-state is displayed on the light emission display portion in the front face. As a result, it is possible to simultaneously confirm whether or not the SC-type optical connector plugs each inserted into the fitting portions in both ends of the optical adapter are in the half-inserted state, by viewing the light emission display portion from the front face, and it is possible to prevent the poor connection accident of the SC-type optical connector plug from being generated.

BRIEF DESCRIPTION OF DRAWINGS

FIGS. 1A to 1E show a connection detecting mechanism of an optical connector plug according to a mode for carrying out the present invention, in which FIG. 1A is a back elevational view, FIG. 1B is a plan view, FIG. 1C is a front elevational view, FIG. 1D is a bottom elevational view, and FIG. 1E is a side elevational view;

FIGS. 2A to 2C show the connection detecting mechanism of the optical connector plug, in which FIG. 2A is a perspective view as seen from a diagonally forward direction, FIG. 2B is a perspective view as seen from a diagonally rearward direction, and FIG. 2C is a cross sectional view along a line A-A in FIG. 10;

FIGS. 3A to 3F show an example of a connection detecting device, in which FIG. 3A is a perspective view as seen from a diagonally forward direction, FIG. 3B is a back elevational view, FIG. 3C is a plan view, FIG. 3D is a front elevational view, FIG. 3E is a bottom elevational view, and FIG. 3F is a side elevational view;

FIGS. 4A to 4E show an adapter panel to which an LC-type optical connector interconnecting adapter for two cores is attached, in which FIG. 4A is a back elevational view, FIG. 4B is a plan view, FIG. 4C is a front elevational view, FIG. 4D is a bottom elevational view, and FIG. 4E is a side elevational view;

FIGS. 5A and 5B show the adapter panel to which the LC-type optical connector interconnecting adapter for two cores is attached, in which FIG. 5A is a perspective view as seen from a diagonally forward direction, and FIG. 5B is a perspective view as seen from a diagonally rearward direction;

FIGS. 6A to 6E show an LC-type optical connector interconnecting adapter for two cores attached to an adapter panel, in which FIG. 6A is a plan view, FIG. 6B is a side elevational view, FIG. 6C is a bottom elevational view, FIG. 6D is a front elevational view, and FIG. 6E is a back elevational view;

FIGS. 7A to 7D show the LC-type optical connector interconnecting adapter for two cores attached to the adapter panel, in which FIG. 7A is a perspective view as seen from a diagonally forward direction, FIG. 7B is a perspective view as seen from a diagonally rearward direction, FIG. 7C is a cross sectional view long a line B-B in FIG. 6D, and FIG. 7D is a cross sectional view along a line C-C in FIG. 60;

FIGS. 8A to 8H show a procedure for attaching a connection detecting device to an adapter panel to which an LC-type optical connector interconnecting adapter for two cores is attached, in which FIG. 8A is a perspective view of the adapter panel in a state before attachment of the connection detecting device, FIG. 8B is a perspective view in a state in which a screw for fixing the adapter panel is attached, FIG. 8C is a perspective view of the adapter panel in a state in which a brank panel is attached, and FIGS. 8D to 8H are perspective views showing a procedure for attaching the connection detecting device to the adapter panel in place of the brank panel;

FIGS. 9A and 9B show a procedure for attaching the connection detecting device to the adapter panel to which the LC-type optical connector interconnecting adapter for two cores is attached, in which FIG. 9A is an enlarged perspective view showing a main part of a state in which a guide key in a side surface of the connection detecting device is inserted into a guide groove from a forward direction of the optical adapter panel, and FIG. 9B is an enlarged perspective view showing a main part of a state in which a projection in a lower surface of the connection detecting device is fitted to a hole portion in an upper side of the LC-type optical connector interconnecting adapter for two cores;

FIG. 13 shows the connection detecting motion and is a cross sectional view of a state in which the LC-type optical connector plug reaches a fitting completion connection position and a switch lever of the connection detecting device is turned on;

FIGS. 15A to 15D show an actuation detail of the switch lever, in which FIG. 15A is a side elevational view when the switch lever is in an off-state, FIG. 15B is a bottom elevational view of the same, FIG. 15C is a side elevational view when the switch lever is pushed upward so as to come to an on-state, and FIG. 15O is a bottom elevational view of the same;

FIGS. 16A to 16C show a connection detecting motion in a case where an MPO-type optical connector plug is connected to an MPO-type optical connector interconnecting adapter, in which FIG. 16A is a vertical cross sectional view before connection, FIG. 16B is a transverse cross sectional view before connection, and FIG. 16C shows a detail of a switch lever structure and is an enlarged cross sectional view of a main part;

FIGS. 17A and 17B show the connection detecting motion; in which FIG. 17A is a vertical cross sectional view of a state in which an elastic engagement stop comes into contact with the MPO-type optical connector plug, and FIG. 17B is a transverse cross sectional view;

FIGS. 18A and 18B show the connection detecting motion, in which FIG. 18A is a vertical cross sectional view when the MPO-type optical connector plug reaches the optical reference surface position and comes to a half-inserted state, and FIG. 18B is a transverse cross sectional view;

FIGS. 19A to 19B show the connection detecting motion, in which FIG. 19A is a vertical cross sectional view of a state in which the MPO-type optical connector plug reaches a fitting completion connection position and a switch lever of the connection detecting device is turned on, and FIG. 19B is a transverse cross sectional view;

FIG. 23 shows the connection detecting motion and is a vertical cross sectional view of a state in which the MU-type optical connector plug reaches the fitting completion connection position and the switch lever of the connection detecting device is turned on;

FIGS. 24A and 24B show a connection detecting motion in a case where an SC-type optical connector plug is connected to an SC-type optical connector interconnecting adapter, in which FIG. 24A is a vertical cross sectional view before connection, and FIG. 24B is a transverse cross sectional view;

FIGS. 25A and 25B show the connection detecting motion, in which FIG. 25A is a vertical cross sectional view of a state in which a locking piece comes into contact with the SC-type optical connector plug, and FIG. 25B is a transverse cross sectional view;

FIGS. 26A and 26B show the connection detecting motion, in which FIG. 26A is a vertical cross sectional view when the SC-type optical connector plug reaches the optical reference surface position and comes to the half-inserted state, and FIG. 26B is a transverse cross sectional view; and FIGS. 27A and 27B show the connection detecting motion, in which FIG. 27A is a vertical cross sectional view of a state in which the SC-type optical connector plug reaches the fitting completion connection position and the switch lever of the connection detecting device is turned on, and FIG. 27B is a transverse cross sectional view.

DESCRIPTION OF EMBODIMENTS

A description will be in detail given below of an embodiment of a connection detecting mechanism of an optical connector plug according to the present invention with reference to the accompanying drawings. In the following description, a description will be sequentially given of respective connection detecting mechanisms of an LC-type optical connector, an MPO-type optical connector, an MU-type optical connector, and an SC-type optical connector. The LC-type optical connector and the like are made for two cores, however, may be made for a single core or four or more cores.

<Connection Detecting Mechanism of LC-Type Optical Connector for Two Cores>

Figure 10:
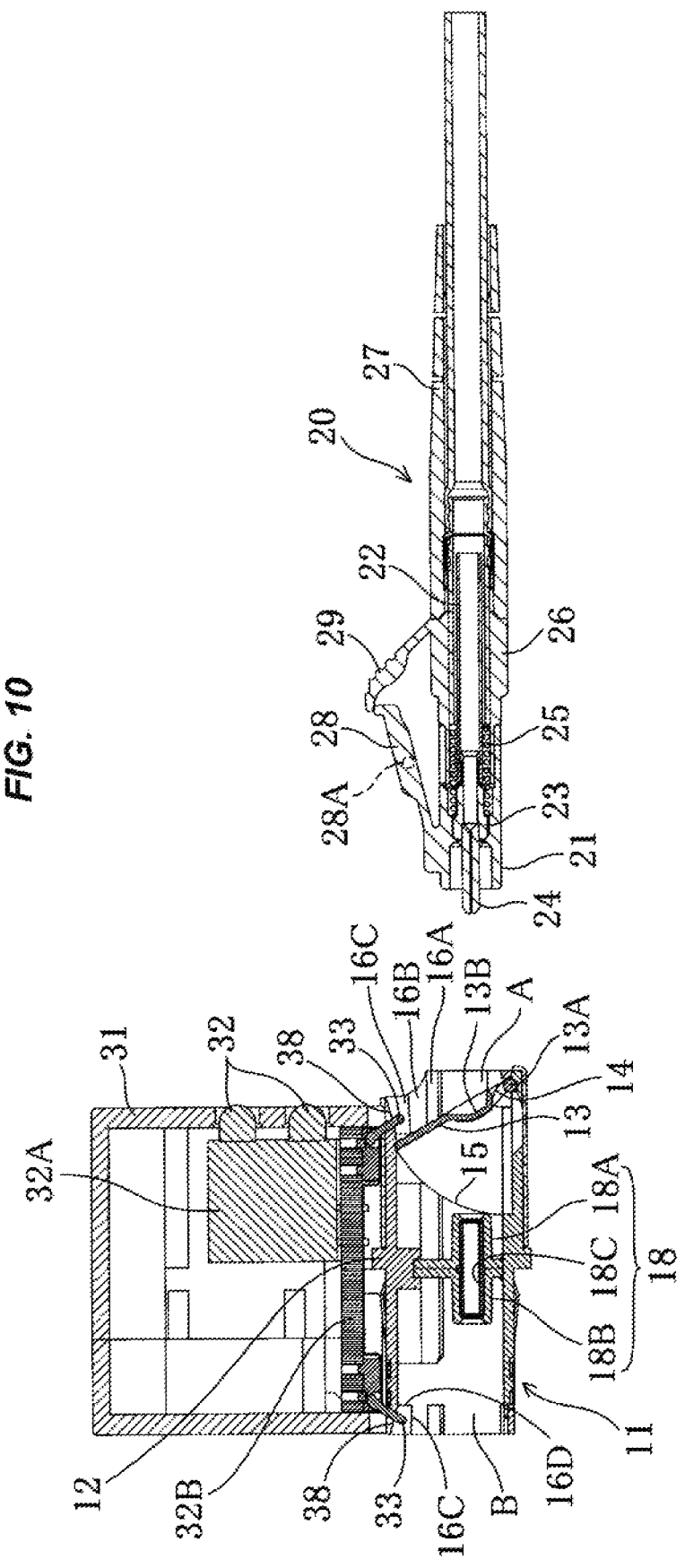
FIG. 10 shows a connection detecting motion and is a cross sectional view of a state in which an LC-type optical connector plug is connected to an LC-type optical connector interconnecting adapter for two cores.
Figure 11:
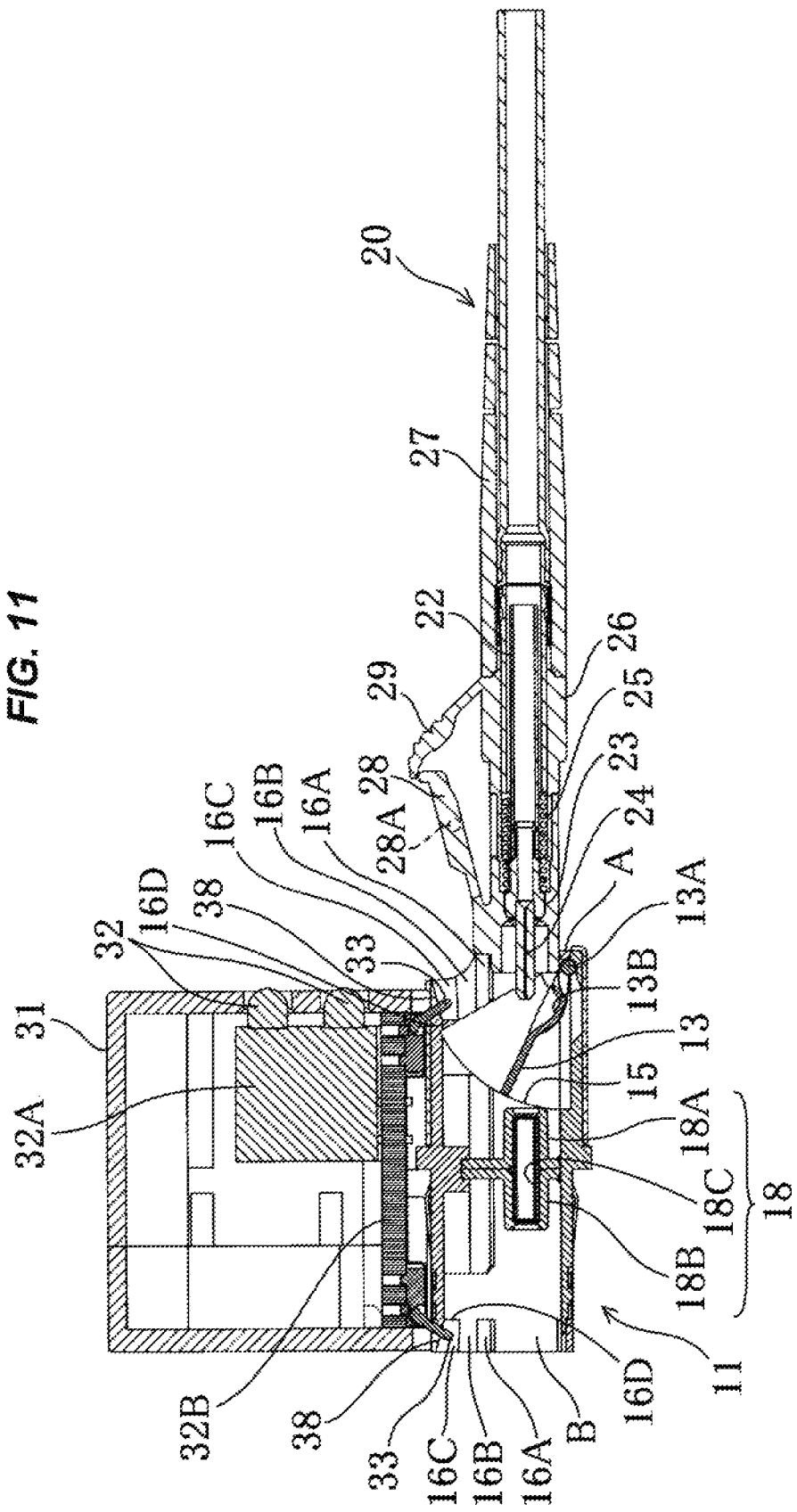
FIG. 11 shows the connection detecting motion and is a cross sectional view of a state in which the LC-type optical connector plug is inserted and a shutter is half open.

A connection detecting mechanism of an LC-type optical connector for two cores according to the present embodiment is mounted, as shown in FIG. 1E, to FIGS. 5A and 5B, FIG. 10, and, FIG. 11, in each of a plurality of rectangular opening portions which are formed in a lower end side in a longitudinal direction of a thin rectangular optical adapter panel 1 mounted, for example, to a light wiring rack and the like (not shown), such that LC-type optical connector interconnecting adapters 11 (hereinafter abbreviated to optical adapters 11) for two cores for interconnecting a pair of opposing two-core LC-type optical connector plugs 20 (hereinafter, abbreviated to optical plugs 20) are arranged side by side each other in a horizontal direction, and is structured such that a connection detecting device 31 having a light emission display portion 32, for example, an LED pilot lamp and the like for detecting connection in a front face and a switch lever 33 made of resin and provided for detecting connection in both front and rear ends in a lower face, and formed into a rectangular housing shape is installed to an attaching recess 2 which is notched into a rectangular shape in an upper end side of the adapter panel 1 in a longitudinal direction in such a manner as to approximately correspond to a transverse width obtained by totalizing the plurality of rectangular opening portions. The attaching recess 2 at this time has approximately the same width as a length of the connection detecting device 31, and both right and left side wall surfaces of the connection detecting device 31 are retained in right and left opposing inner edges within the attaching recess 2 by a retention frame portion 2A which is bent into an L-shaped form.

Further, the switch lever 33 is provided in both the front and rear end sides in the lower face of the connection detecting device 31 in the illustrated example, however, the lever 33 may be installed only in the front side. In this case, the light emission display portion 32 mentioned later is arranged only at any one of the upper and lower positions without a pair of light emission display portions 32 being arranged in the upper and lower portions.

Figure 1A:
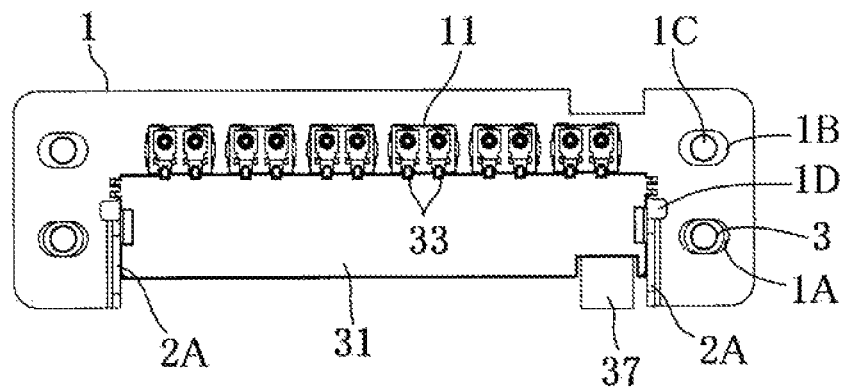
Figure 1B:
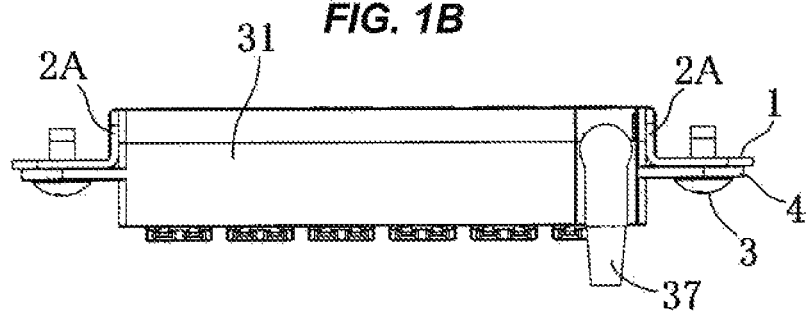
Figure 1E:
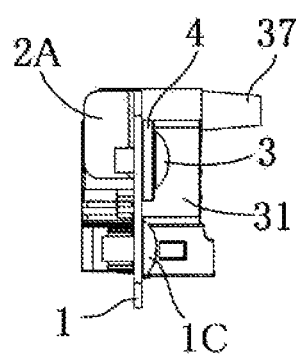
Figure 1C:
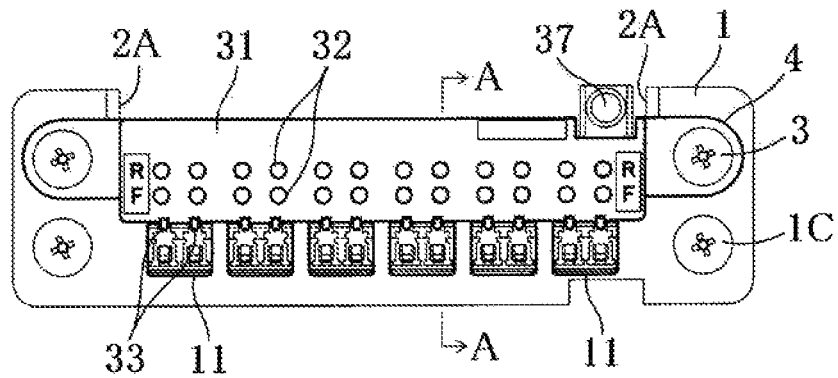
Figure 1D:
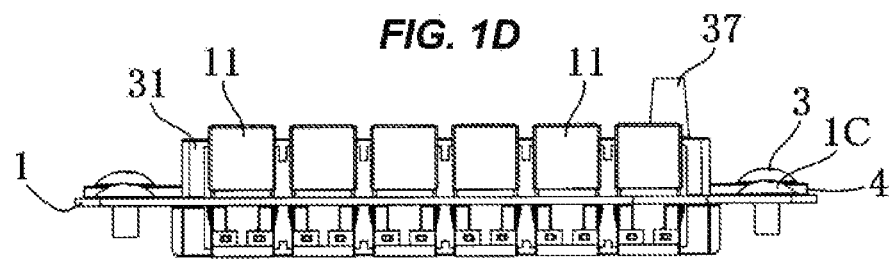
Figure 2A:
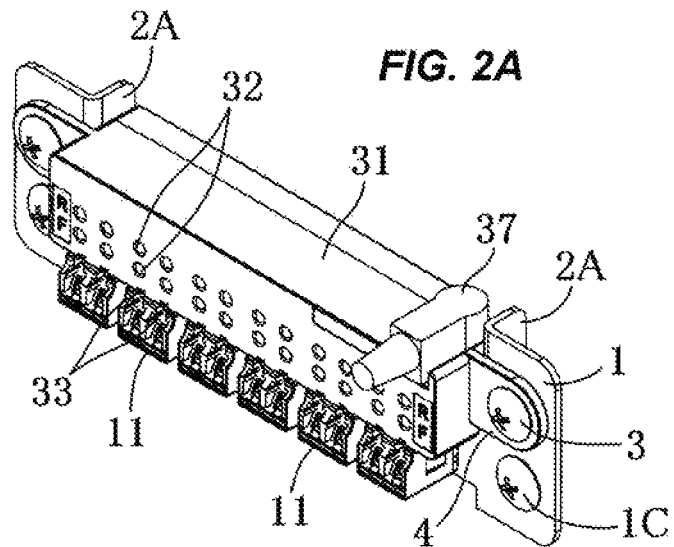
Figure 2B:
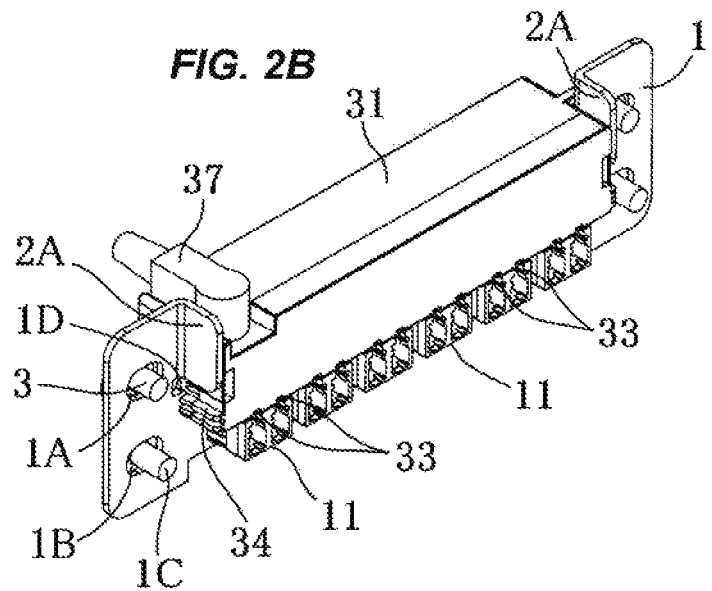
Figure 2C:
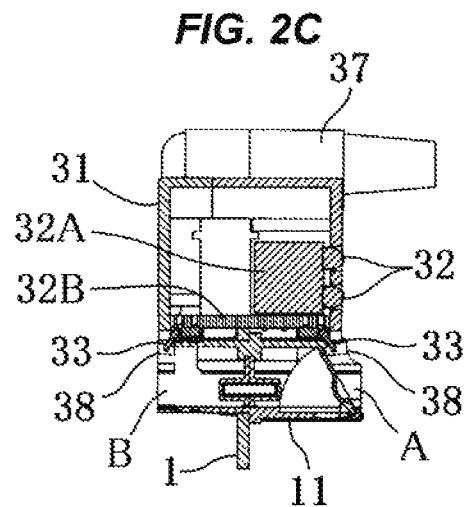
Figure 4A:
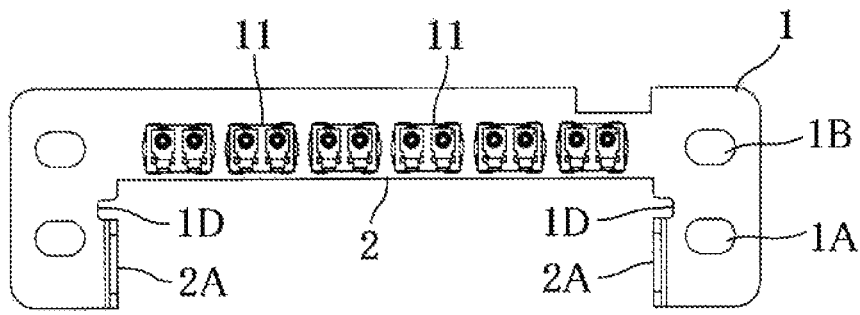
Figure 4B:
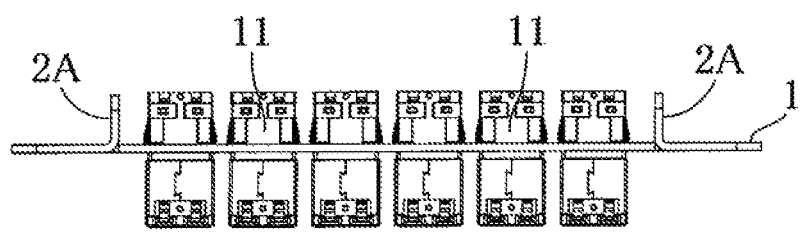
Figure 4C:
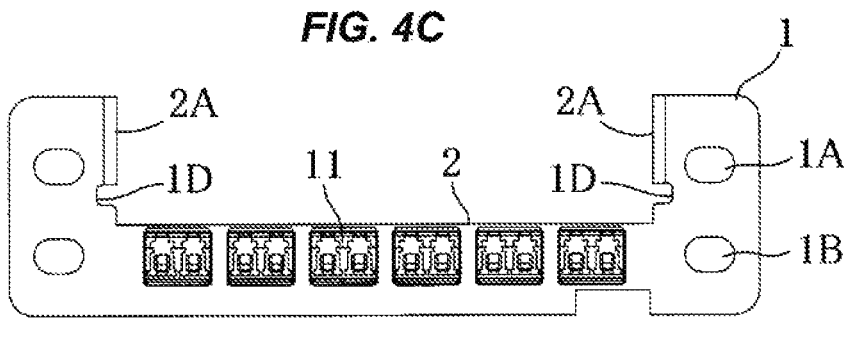
Figure 4E:
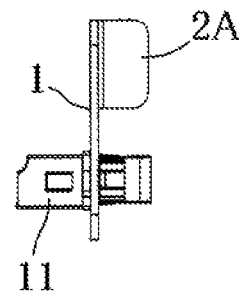
Figure 4D:
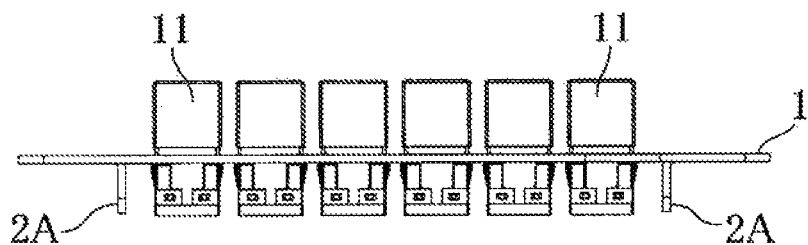
Figure 5A:
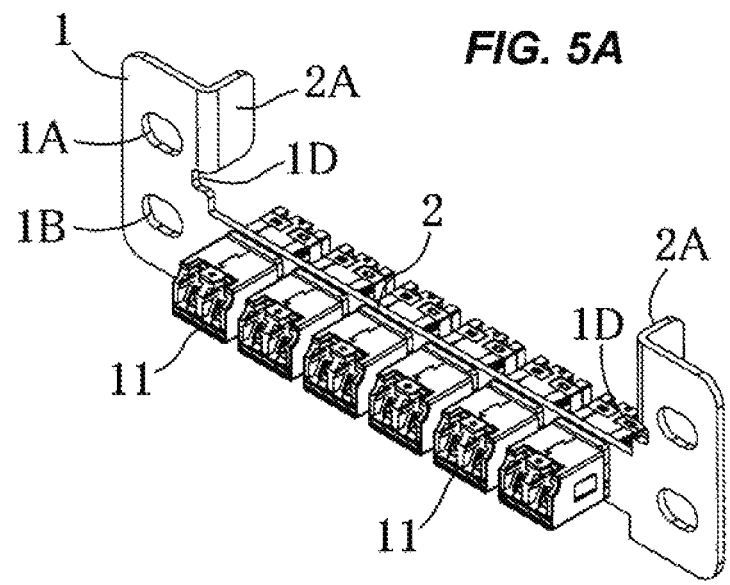
Figure 5B:
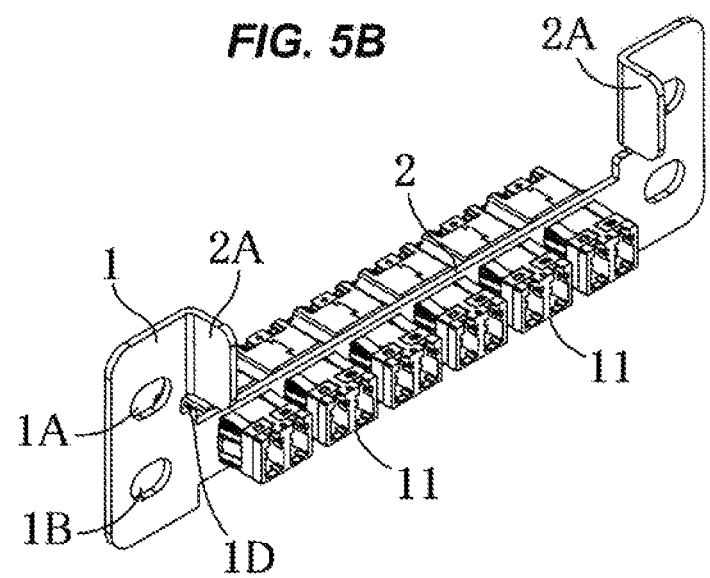
Figure 8A:
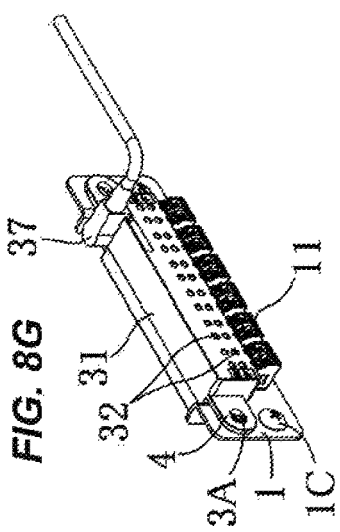
Figure 8B:
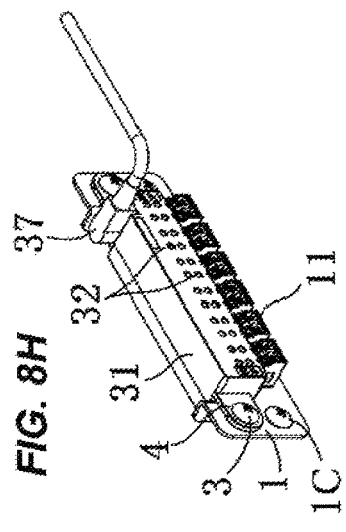
Figure 8D:
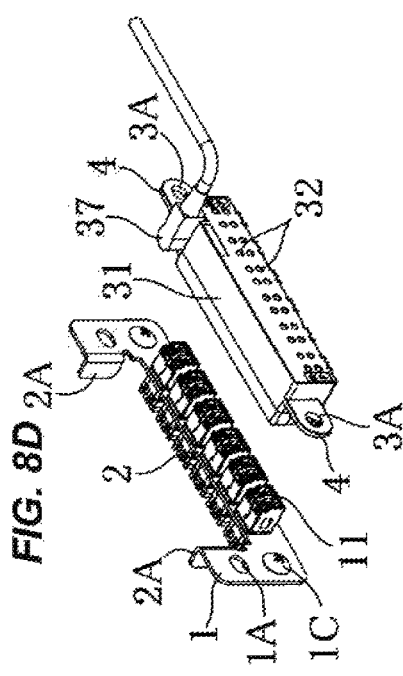
Figure 8E:
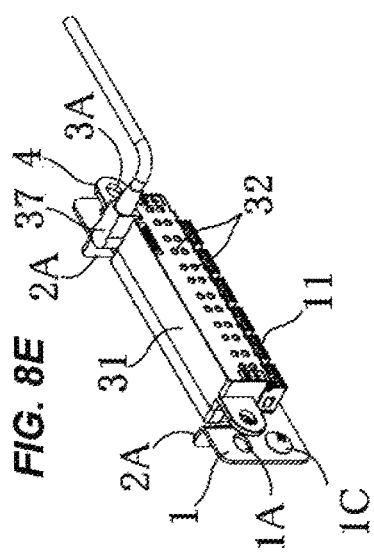
Figure 8F:
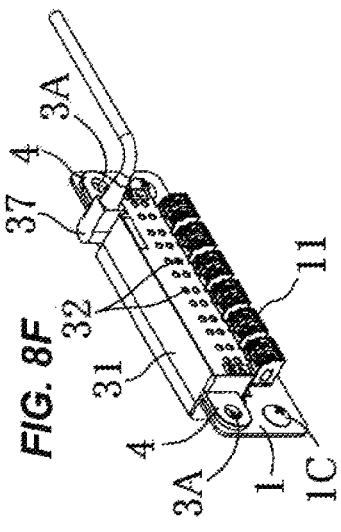
Figure 8C:
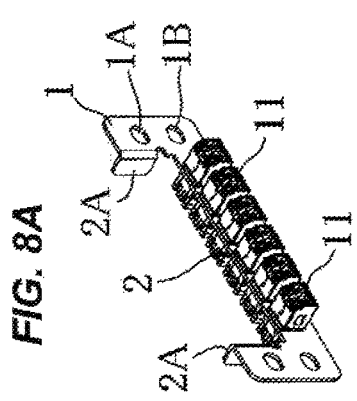

For information, when the connection detecting device 31 is not used, a blank panel 40 provided in its surface with a port display label 39 is previously attached to the attaching recess 2 of the optical adapter panel 1 (refer to FIG. 8C).

As shown in FIGS. 1A to 5B and FIG. 9A, mounting flange portions 4 are provided in both right and left side faces of the connection detecting device 31, and are mounted to the optical wiring rack (not shown) by inserting screws 3 from threaded holes 3A which are formed in the right and left mounting flange portion 4 into threaded holes 1A which are formed in both right and left upper sides of the optical adapter panel 1. Further, guide keys 34 which are horizontal in a front-back direction are provided at positions which are separated to a rearward direction of the mounting flange portion 4 in lower sides of both the right and left side surfaces of the connection detecting device 31, and guide grooves 1D for inserting the guide keys 34 from a forward direction of the adapter panel 1 are provided at opposing positions of right and left inner edges in the attaching recess 2 of the optical adapter panel 1 in correspondence thereto. For information, it can be mounted to the optical wiring rack (not shown) by inserting the screws 10 into the threaded holes 1B which are formed in the lower sides of both the right and left ends of the optical adapter panel 1.

Further, as shown in FIGS. 3A, 3B, 3D, 3E and FIG. 9B, downward projections 35 are provided in both front and rear end sides of the lower face of the connection detecting device 31, and hole portions 36 (refer to FIG. 6A and FIGS. 7A, 7B and 7D mentioned later) are provided in upper wall sides of opening ends of both the fitting portions of the optical adapter 11 in such a manner as to correspond thereto. The optical adapter 11 is positioned in relation to the connection detecting device 31 by moving downward the connection detecting device 31 in a state in which the connection detecting device 31 is locked to the optical adapter panel 1 by the mounting flange portion 4, and fitting the projections 35 to the hole portions 36. A communication connector 37 for connecting a communication cable with a relay portion (not shown) is connected to the connection detecting device 31 (refer to FIGS. 1A to 1E and FIGS. 2A to 2C). Reference sign 37a in the drawing denotes a connector to which the communication connector 37 is fitted. For information, the connection detecting device 31 can be used along, for example, as a built-in battery type, and in this case, the communication connector 37 may be omitted. Further, the hole portions 36 may be formed in the connection detecting device 31 side, and the projections 35 may be formed in the optical adapter 11 side.

The light emission display portions 32 in the front face of the connection detecting device 31 are provided side by side at upper and lower positions in correspondence to the fitting portions A and B in both the front and rear ends of the optical adapter 11. Further, a belt-like port display label 39 having a port number printed as already mentioned is stuck to an upper side of the light emission display portion 32. For information, the port display may be impressed on a front face of the connection detecting device 31. A substrate 32B mounting a power control circuit 32A and the like of the light emission display portion 32 thereto is inward installed in an inner portion of the connection detecting device 31 the resin switch lever 33 for detecting connection is arranged in a biased manner in both the front and rear ends of the substrate 32B in a state of being directed to a diagonally forward direction by a compression spring 33D mentioned later, and a leading end of the switch lever 33 is faced to each of rectangular incision-shaped notch concave portions 38 mentioned later in both the front and rear fitting portions of the optical adapter 11. The light emission display portion 32 in an upper rear side at this time is electrically connected to the switch lever 33 in the rear side, and the light emission display portion 32 in a lower front side is electrically connected to the switch lever 33 in the front side.

As shown in FIGS. 1B, 1C, FIGS. 2A, 2C, FIGS. 3A, 3C, FIGS. 7A to 7D, and FIG. 10 to FIG. 13, the light emission display portions 32 such as LED pilot lamps and the like are provided at positions corresponding to the switch levers 33 in the front face lower end side of the device 31, in the front face of the connection detecting device 31, the LED pilot lamp and the like constructing a pair of rear "R" side and front "F" side respectively in an upper side and in a lower side of the connection detecting device, and being capable of changing its display, for example, to a lighting color "green" indicating an on-state and to a lighting color "red" indicating an off-state. More specifically, the switch lever 33 is formed by a resin material, and as shown in FIG. 14 and FIG. 15, a switch outline portion 33A is installed in an inner bottom portion of the connection detecting device 31, and the switch lever 33 is arranged in one end side of the switch outline portion 33A so as to be swingable by a spindle 33B. Further, a switch unit 33C is provided approximately at the center of an inner portion of the switch outline portion 33A so as to be slidable forward and rearward, and an end portion in the spindle 33B side of the switch lever 33 comes into contact with a front end portion of the switch unit 33C.

The switch unit 33C is biased to a forward direction (to the switch lever 33 side) by a compression spring 33D which is arranged in a rearward direction, and a leading end of the switch lever 33 is biased with a resilient force of the compression spring 33D in such a manner as to be directed like a downward inclined manner via the switch unit 33C. In this case, as shown in FIG. 10 to FIG. 13, before the insertion of the optical plug 20 into the optical adapter 11, the leading end of the switch lever 33 is arranged within the notch concave portion 38 of the optical adapter 11 in a state of being inclined downward toward a forward direction in relation to the fitting opening portion.

As shown in FIGS. 15A to 15D, a male side contact spring 33E protruding approximately like an L-shaped form from a side surface is attached to the switch unit 33C, and the switch unit 33C slides integrally with the male side contact spring 33E. Further, a female side contact spring 33F obtained by forming a bifurcated spring leading end into a beak shape (an X-shaped form) is provided in an inner portion of the switch outline portion 33A in correspondence to the male side contact spring 33E. When the switch unit 33C is pushed and moves rearward on the basis of an upward swinging motion of the switch lever 33 via the spindle 33B, the L-shaped leading end side of the male side contact spring 33E is pinched and fitted to the beak portion of the female side contact spring 33F. As a result, the light emission display portion 32 comes to a switch-on state.

The optical adapter 11 is provided in both ends respectively with the fitting portions A and B of the optical plug 20, as shown in FIGS. 6A to 6E and FIGS. 7A to 7D, in such a manner that optical axes coincide with each other, has in an inner portion thereof a sleeve holder 18 for butt jointing the ferrule leading end portions of each of the optical plugs 20 inserted from the fitting portions A and B in both ends, and is formed in upper wall sides of the opening ends of both the front and rear fitting portions A and B of the optical adapter 11 the rectangular incision-shaped notch concave portions 38. Further, the leading end side of the switch lever 33 of the connection detecting device 31 is faced to the notch concave portion 38, the switch lever 33 is pushed up to the switch-on state at the connection finishing time that the optical plug 20 is fully inserted into the fitting portion of the optical adapter 11 instead of being in the half-inserted state, and the "green" lighting color indicating the on-state is displayed on the light emission display portion 32 in the front face. In the meantime, in the half-inserted state at the non-connecting state, the switch lever 33 is kept in the switch-off state in which the switch lever 33 is pushed down, and the light emission display portion 32 in the front face is displayed to the "red" lighting color indicating the off-state (may be turned off the light or may blink). As mentioned above, the light emission display portion 32 is displayed so as to be viewable the switch lever 33 in correspondence to the on or off state of the switch lever 33.

In the present embodiment, the optical adapter 11 is an LC-type optical connector interconnecting adapter for two cores for interconnecting the optical plug 20 having a pair of opposing two-core LC-type optical connector plugs in which a latch lever 28 detachably engaging with the optical adapter 11 is formed on an upper face in a longitudinal direction of a plug from a forward direction toward a rearward direction, as shown in FIG. 10 to FIG. 13. When the optical plug 20 is fully inserted into the fitting portion A of the optical adapter 11 instead of being in the half-inserted state and is completed its connection, right and left engagement projections 28A of the latch lever 28 passing through a flared portion 16C of the optical adapter 11 and rising up (deformation restored) are fitted to the fitting grooves 16D as mentioned later. As a result, the latch lever 28 pushes up the switch lever 33 of the connection detecting device 31 to be the switch-on state from the switch-off state, and the light emission display portion 32 in the front face is displayed into the "green" lighting color indicating the on-state.

In particular, as shown in FIGS. 7A to 7D and FIG. 10 to FIG. 13, the optical adapter 11 for interconnecting the two-core LC-type optical connectors is provided with the connector housing 12, and is formed into a rectangular tube body having in both ends the fitting portions A and B into which a pair of opposing optical plugs 20 can be inserted mutually from both ends. At the center of the inner portion of the connector housing 12, one cylinder 18A constructing a sleeve holder 18 is provided so as to protrude toward one fitting portion A, and the other cylinder 18B is provided so as to protrude toward the other fitting portion B, as shown in FIG. 7O, and FIG. 10 to FIG. 13. Both the cylinders 18A and 18B are formed in such a manner that center axes coincide with each other on an optical axis, and a split sleeve 18C is arranged within both the adjacent cylinders 18A and 18B in an inward inserted state.

A fixing bracket 19 having a plurality of locking springs for fixing panels each of which is formed by an approximately C-shaped metal frame piece is installed and fixed to each of right and left side walls of the connector housing 12 on the basis of engagement between a locking projection 12A provided in the connector housing 12 side and a locking hole 19A provided in the fixing bracket 19 side.

Further, as shown in FIGS. 7A to 7D, an inward C-shaped concave groove portion 16B having a guide ridge 16A in a lower side for guiding insertion of the optical plug 20 is formed in a horizontal direction along a longitudinal direction in upper sides of right and left side walls in the inner portion of the connector housing 12. The flared portion 16C having the fitting grooves 16D in the inner end side is formed in the inner portion of the optical adapter 11, and the right and left engagement projections 28A of the latch lever 28 passing through the flared portion 16C and risen up (deformation restored) by the spring force are fitted to the fitting grooves 16D. The guide ridge 16A, the concave groove portion 16B and the fitting grooves 16D correspond to a concavo-convex outline shape of the optical plug 20.

A shutter plate 13 for closing the fitting portion A according to a diagonal arrangement is arranged in the one fitting portion A of the connector housing 12 in such a manner as to be openable and closable in the inner side of the fitting portion A via the spindle 13A. Further, the shutter plate 13 is biased in a closing direction by bringing one end of the leaf spring 14 into contact with an internal bottom surface of the connector housing 12 via the spindle 13A, and bringing the other end into pressure contact with an inside surface of the shutter plate 13. For information, a fan-shaped depression portion 15 (refer to FIG. 7C) in which the spindle 13A is a so-called pivot of a fan is formed in each of the right and left side walls so as to make the shutter plate 13 be swingable to be openable and closable. Further, a depression-shaped clearance portion 13B is formed in the shutter plate 13 in such a manner that a ferrule leading end portion mentioned later does not come into contact with a front face of the shutter plate 13 when the optical plug 20 is inserted from a diagonally upward direction short of the fitting portion A of the connector housing 12. For information, in the present example, the connector housing 12 with the shutter plate 13 is used, however, a normal adapter with no shutter plate 13 may be used.

The LC-type optical plug 20 is provided with a coupling sleeve 21 which is made of plastics having a comparatively high strength, a ferrule 24 which is installed to a ferrule tube 22 and a ferrule frame 23 within the coupling sleeve 21, a spring 25 which is installed to an outer periphery of a rear end portion of the ferrule frame 23, a main body frame 26 which is fitted to the rear end portion of the ferrule frame 23 via the spring 25 and is made of plastics, and a boot 27 which is installed to a rear portion of the main body frame 26, as shown in FIG. 10 to FIG. 13.

Further, an outer peripheral surface of the coupling sleeve 21 is provided with a latch lever 28 which has the pair of right and left engagement projections 28A inserted into the inward C-shaped concave groove portion 16B arranged in the upper side within the fitting portions A and B arranged in both ends of the connector housing 12 while engaging therewith, and is integrally provided with the coupling sleeve 21 for engaging with the fitting grooves 16D and disengaging from the fitting grooves 16D. The latch lever 28 is extended while inclining so as to be away from the outer surface of the coupling sleeve 21 little by little toward a rear end portion from the leading end portion of the coupling sleeve 21, and the rear end portion protrudes in an inclined manner to an opposite side to the coupling sleeve 21 in such a manner as to come into contact with a release lever 29 which is formed on an outer peripheral surface of the main body frame 27.

Figure 13:
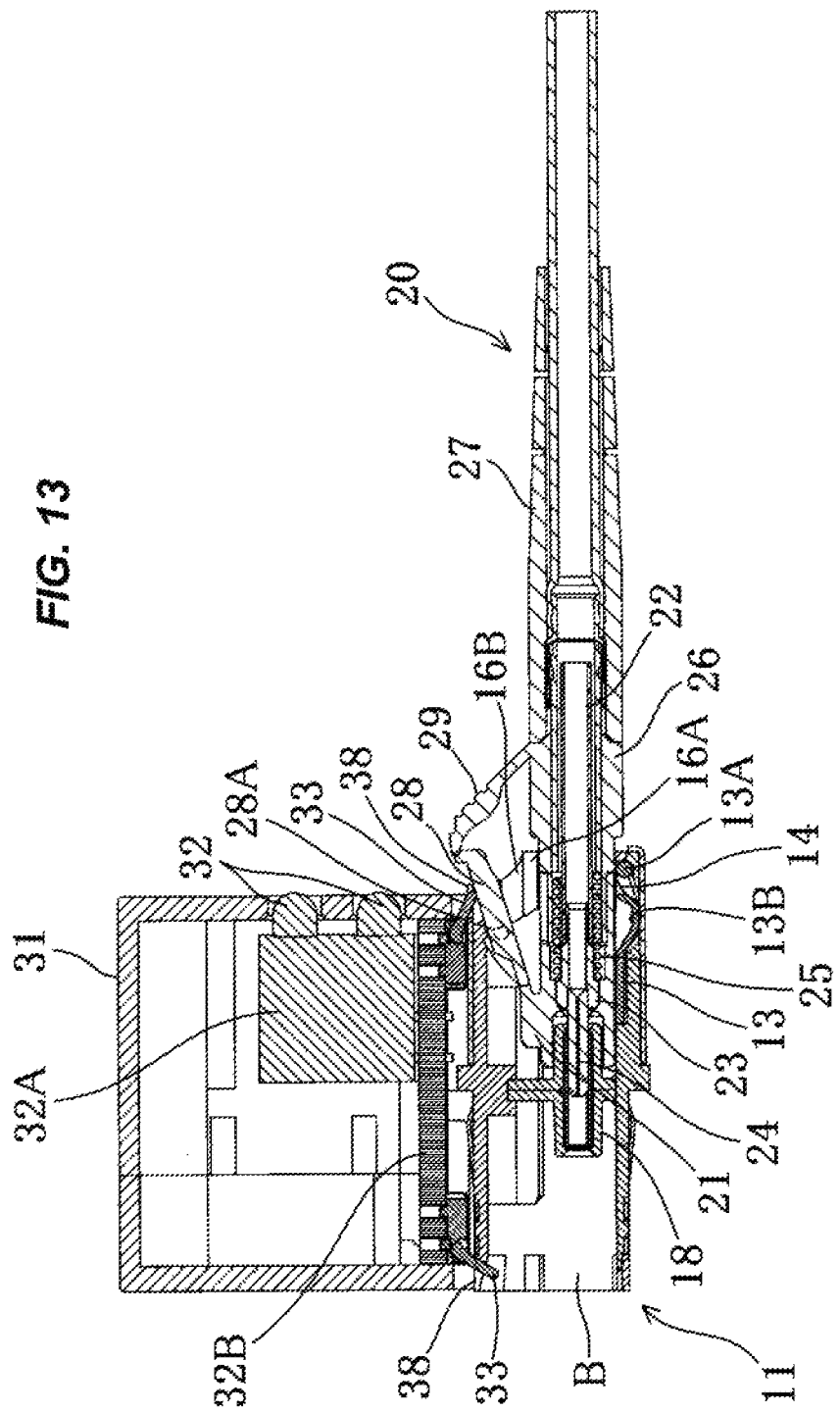
Figure 14:
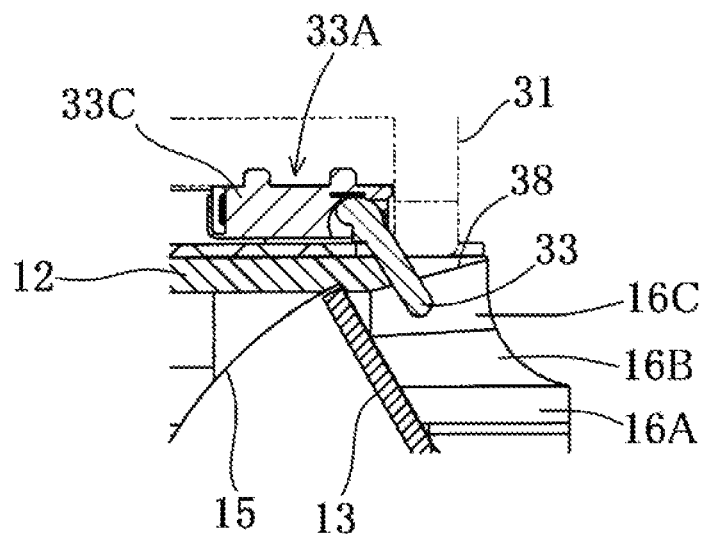
FIG. 14 is an enlarged cross sectional view of a main part showing a detail of a switch lever mechanism.
Figure 15A:
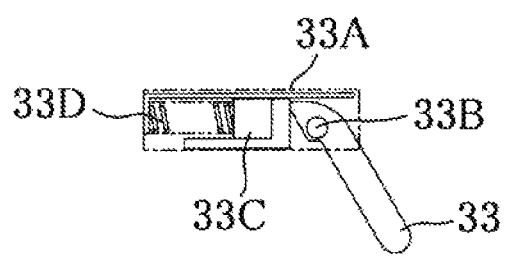
Figure 15C:
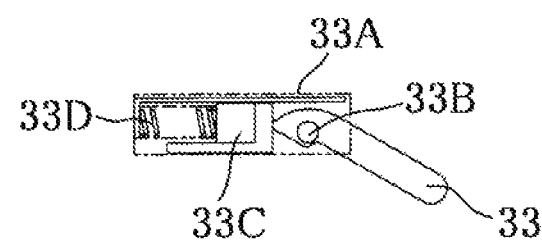
Figure 15B:
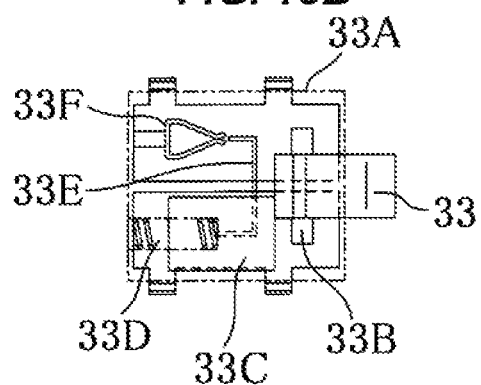
Figure 15D:
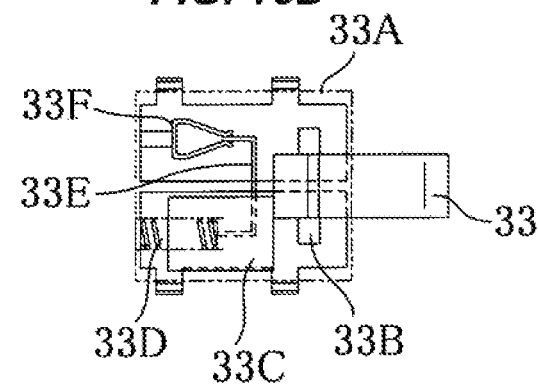
Figure 20:
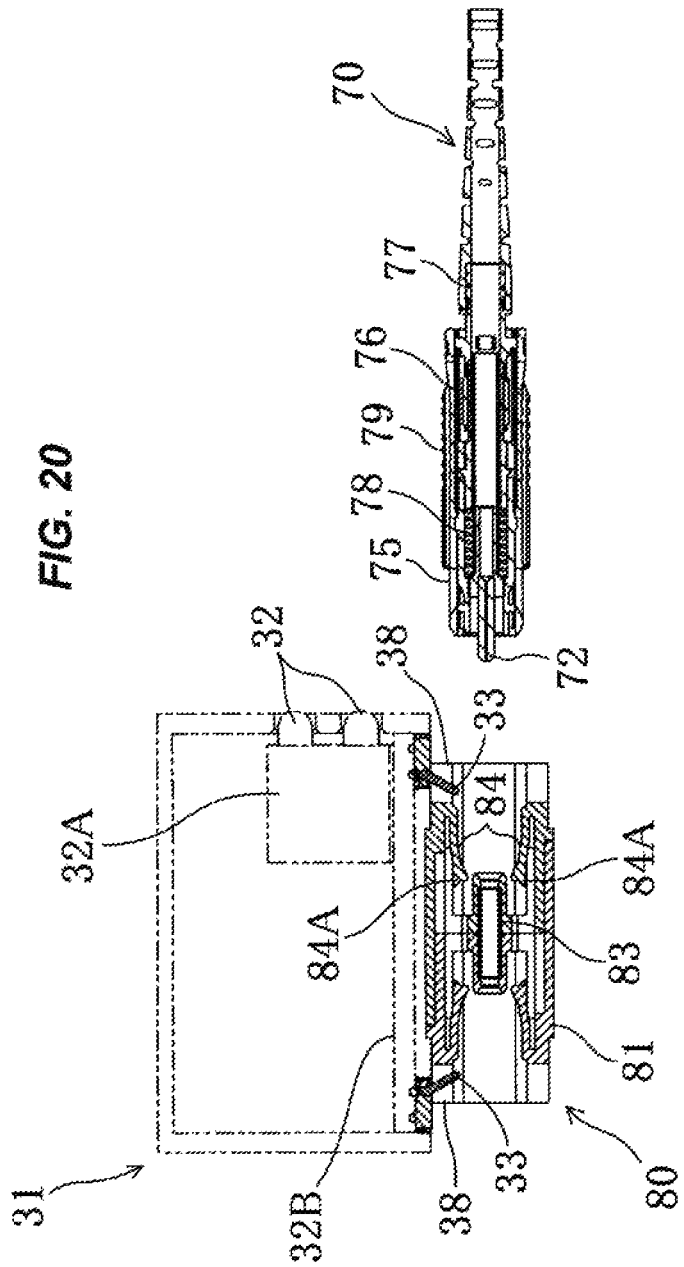
FIG. 20 is a vertical cross sectional view before connection and shows a connection detecting motion in a case where an MU-type optical connector plug is connected to an MU-type optical connector interconnecting adapter.
Figure 21:
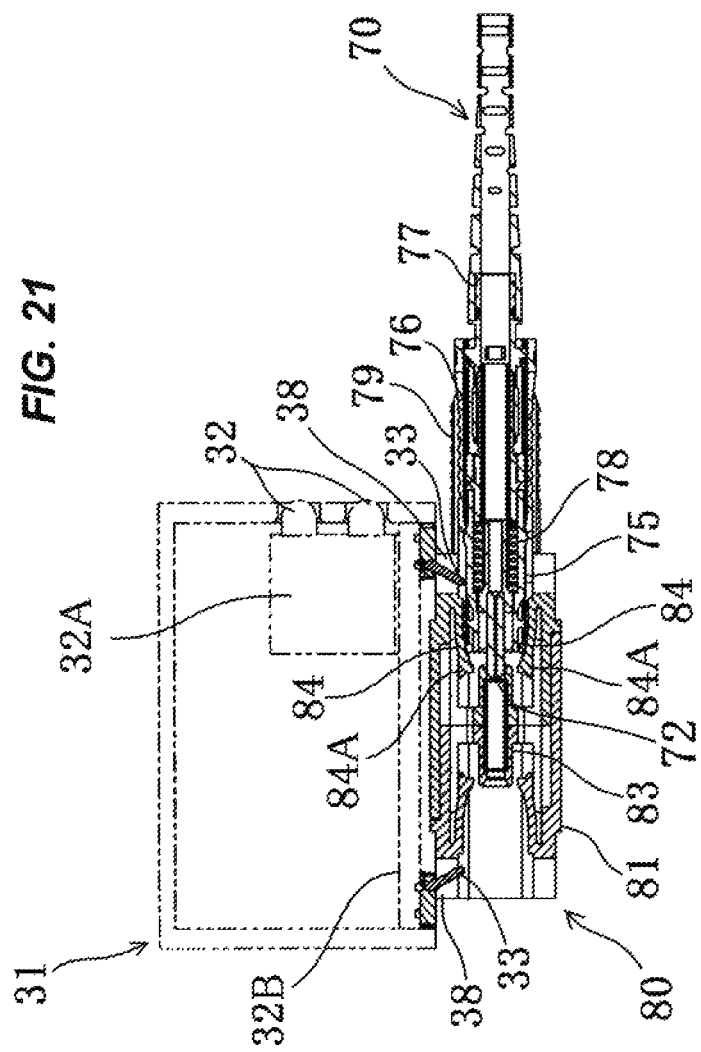
FIG. 21 shows the connection detecting motion and is a vertical cross sectional view of a state in which a locking piece comes into contact with the MU-type optical connector plug.
Figure 22:
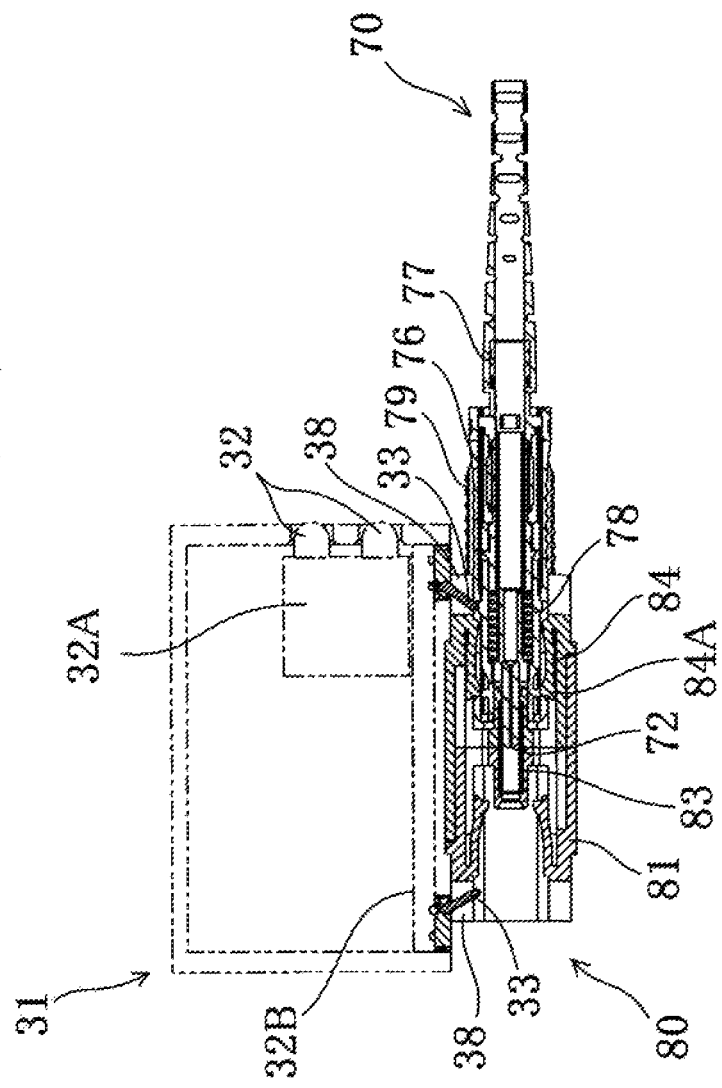
FIG. 22 shows the connection detecting motion and is a vertical cross sectional view when the MU-type optical connector plug reaches the optical reference surface position and comes to a half-inserted state.

As mentioned above, the ferrule 24 of the optical plug 20 installed from the one opening side (for example, the fitting portion A) of the connector housing 12 is fitted to one side of the sleeve holder 18, and the ferrule 24 of the optical plug 20 connected thereto is fitted to the other side of the sleeve holder 18, thereby aligning in a straight line in an axial direction while bringing the leading ends of both the ferrules 24 via the split sleeve 18C which is inward installed over both the cylinders 18a and 18b (refer to FIG. 13). For information, in place of constructing the LC-type optical connector interconnecting adapter 11 by the connector housing 12 for two cores mentioned above, the LC-type optical connector interconnecting adapter may be constructed by a connector housing 12 for a single core or four or more cores.

Next, a description will be given of an example of an assembly, a use and a motion of the best mode structured as mentioned above.

First, when the connection detecting device 31 is not used, the connection detecting device 31 is mounted to an optical wiring rack and the like (not shown) by inserting the screws 1C into the threaded holes 1B in both the right and left end lower sides of the optical adapter panel 1, as shown in FIGS. 8A and 8B. Further, as shown in FIG. 8C, the blank panel 40 additionally provided with the port display label 39 on the surface thereof is previously attached to the threaded hole 1A with the screw 3 in such a manner as to close the attaching recess 2 of the optical adapter panel 1.

Figure 9A:
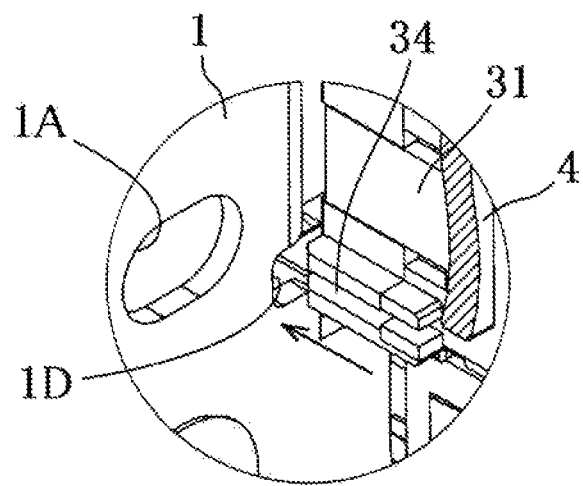

When the connection detecting device 31 is assembled in the optical adapter panel 1, the blank panel 40 is detached so as to open the attaching recess 2 by detaching the screw 3 from the threaded hole 1A, and the connection detecting device 31 is installed within the attaching recess so as to be pinched by the retention frame portion 2A, as shown in FIG. 8D. At this time, as shown in FIG. 8E and FIG. 9A, the guide key 34 of the connection detecting device 31 is inserted into the guide groove 1D in the attaching recess 2 of the optical adapter panel 1 from the forward direction.

Figure 8G:
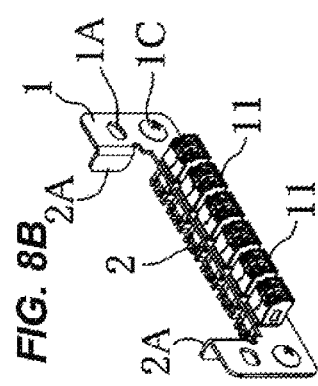
Figure 8H:
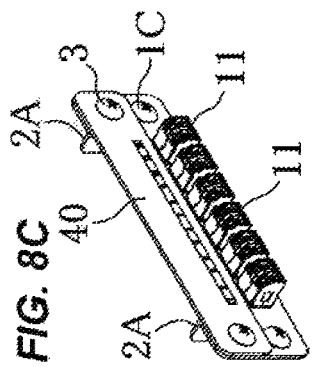
Figure 9B:
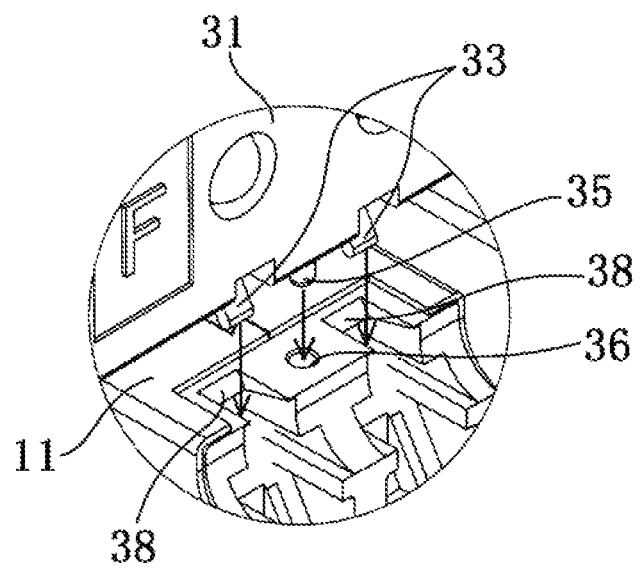

Further, as shown in FIG. 8G and FIG. 9B, the optical adapter 11 is positioned in relation to the connection detecting device 31 by moving the connection detecting device 31 downward and fitting the projection 35 in the lower face of the connection detecting device 31 to the hole portion 36 of the optical adapter 11 with the mounting flange portion 4 of the connection detecting device 31 coming into contact with the front face of the optical adapter panel 1. At this time, the thread hole 3A of the mounting flange portion 4 and the threaded hole 1A of the optical adapter panel 1 are in a consistent state. Further, as shown in FIG. 8H, the screw 3 is inserted into the threaded hole 3A of the mounting flange portion 4 and a whole of the optical adapter panel 1 is fixed to the optical wiring rack and the like (not shown).

Next, as shown in FIG. 10, in a case where the optical plug 20 is used in relation to the optical adapter 11, the shutter plate 13 first closes the fitting end on the one fitting portion A with a resilient force of the leaf spring 14 in an expanding direction, before the optical plug 20 is fitted to the one fitting portion A of the connector housing 12. At this time, a side surface of a movable portion of the shutter plate 13 is locked by a step-like abutment surface of the depression portion 15.

As shown in FIG. 11, the closed shutter plate 13 is pushed by an opening edge portion in the leading end of the cylindrical coupling sleeve 21 covering the periphery of the ferrule 24 without bringing the leading end portion of the ferrule 24 of the optical plug 20 into contact with the front face of the shutter plate 13, and the shutter plate 13 is tilted to an inner side of the fitting end against the resilient force of the leaf spring 14. At this time, the side surface of the movable portion of the shutter plate 13 swings the shutter plate 13 itself in an opening direction (to a lower side) while engaging with the right and left fan-shaped depression portions 15.

Figure 12:
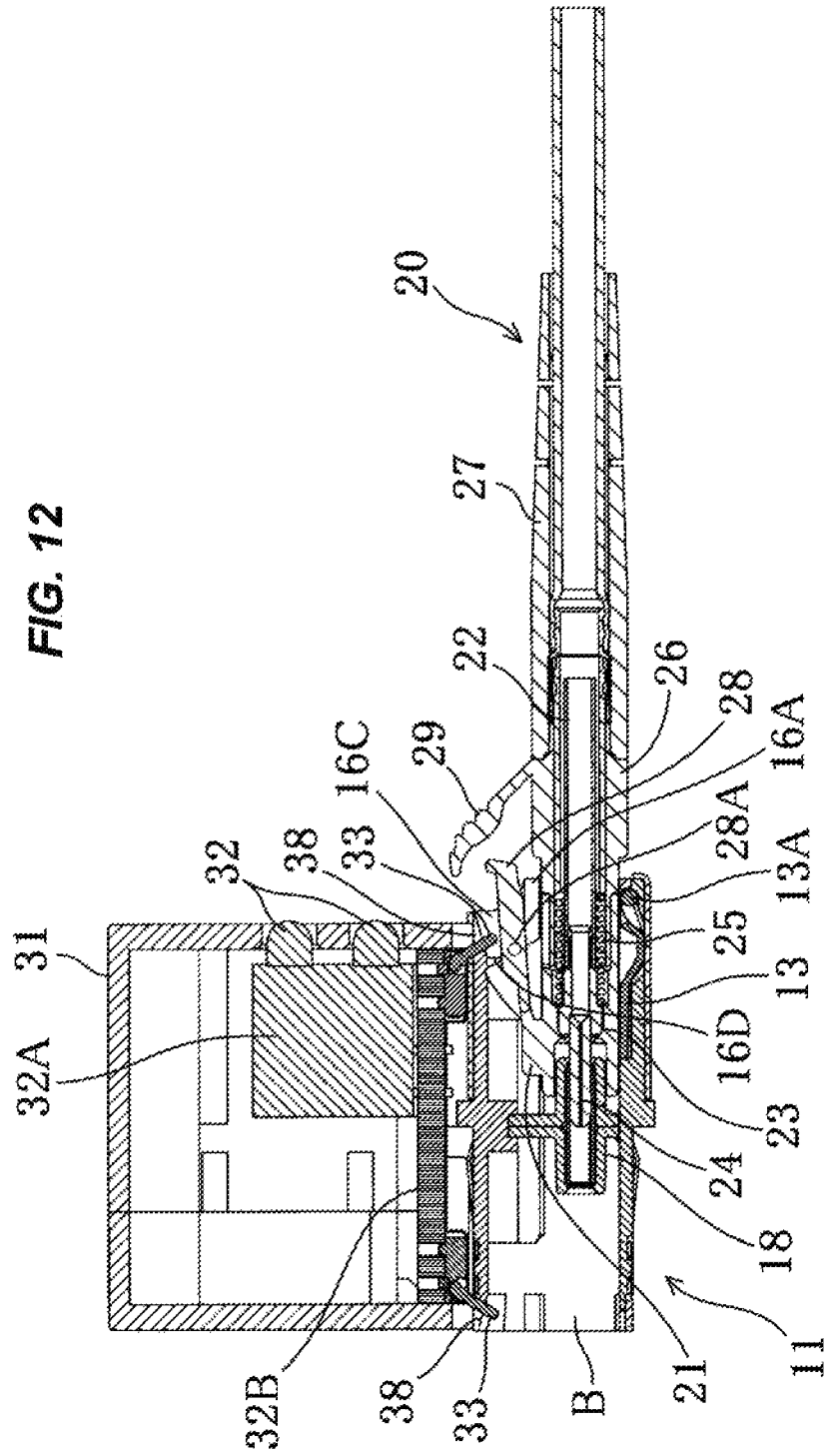
FIG. 12 shows the connection detecting motion and is a cross sectional view of a state in which the LC-type optical connector plug reaches an optical reference surface position and is in a half-inserted state.

As shown in FIG. 12, by further pressing the optical plug 20 into the fitting portion A of the connector housing 12, the optical plug 20 itself is inserted in a horizontal state in conjunction with an inserting process on the basis of the existence of the inward C-shaped concave groove portion 16B having the guide ridge 16A in the lower side of the fitting portion A of the connector housing 12. At this time, the right and left engagement projections 28A of the latch lever 28 are in the process of passing through the flared portion 16C and do not fit to the fitting grooves 16D yet. As a result, the switch lever 33 of the connection detecting device 31 is not yet pushed up by the latch lever 28, and stays in the switch-off state, and the light emission display portion 32 in the front face displays the "red" lighting color indicating the off state (or may be turned off the light or may be blinked). Therefore, it is possible to securely confirm with the front face view that the optical plug 20 is in the half-inserted state in relation to the fitting portion A of the optical adapter 11.

As shown in FIG. 13, when the optical plug 20 is fully inserted into the fitting portion A of the optical adapter 11 instead of being in the half-inserted state and finishes connection, the right and left engagement projections 28A of the latch lever 28 passing through the flared portion 16C of the optical adapter 11 and rising up (deformation restored) by the spring force fit to the fitting grooves 16D. As a result, the latch lever 28 pushes up the switch lever 33 of the connection detecting device 31 and comes to the switch-on state, and the "green" lighting color indicating the on-state is displayed on the light emission display portion 32 in the front face.

<Connection Detecting Mechanism of MPO-Type Optical Connector>

Next, a description will be given in detail of an example in which the connection detecting mechanism according to the present embodiment is applied to an MPO-type optical connector plug with reference to FIG. 16A to FIG. 19B. For information, the structure of the connection detecting device 31 and the internal structure (the switch unit 33C, the female side contact spring 33F and the male side contact spring 33E) of the switch outline portion 33A in the inner portion thereof in the present example are the same as those in the example in which the connection detecting device is applied to the LC-type optical connector plug. Therefore, a detailed description thereof will be omitted or simplified.

As shown in FIG. 16A to FIG. 19B, an optical plug 50 in the present example is an MPO-type optical connector plug having a tubular coupling 53 which outward inserts a ferrule 52 into a sleeve-shaped housing 51 housing the ferrule 51 in a leading end thereof and is provided so as to be slidable in a movable range which is secured in an axial direction of the housing 51.

More specifically, the optical plug 50 is an M-type MPO plug, and is provided with the ferrule 52 which is attached to a leading end of the optical fiber, the sleeve-shaped housing 51 which houses the ferrule 52 in the leading end (the front end), and a spring 55 which is housed within the housing 51 and elastically biases the ferrule 52 to a front side of the connector. Further, the optical plug 50 is provided with the tubular coupling 53 which is outward inserted into the housing 51 and is provided so as to be slidable in the movable range which is secured in the axial direction of the housing 51, and a boot 54 which is attached to a rear end portion opposite to the front end where the ferrule 52 is provided in the housing 51. Accordingly, the coupling 53 is elastically biased to the forward side by springs 56 which are arranged on right and left outer wall surfaces of the housing 51. For information, in the drawing, reference numeral 57 of the optical plug 50 denotes a guide pin which is fitted to and inserted into a pin hole (not shown) formed in the other side F-type optical plug (not shown). The guide pin 57 is inserted into the pin hole of the other side F-type plug so as to butt joint the ferrules 52.

In the connection between the optical plugs 50, the M-type optical plug 50 is inserted into the tubular optical adapter 60 from one end portion in the axial direction and fastened, and the F-type optical plug (not shown) corresponding to the other side is inserted into the optical adapter 60 from the other end portion in the axial direction thereof and fastened, thereby butt jointing the ferrules 52 in the front ends of the respective standard optical plugs 50.

The optical adapter 60 is structured such that a pair of elastic engagement stops 64 are provided in a protruding manner in an inner side of a tubular body 63 in which a connector hole 62 inserting the optical plug 50 thereinto is provided in a penetrating manner, the pair of elastic engagement stops 64 engaging between a pair of front and rear engagement protruding portions 51A and 51B in both sides of the housing 51 of the optical plug 50 so as to freely engage and disengage. Further, the elastic engagement stop 64 is an elastic piece which extends into the connector hole 62 from one end of the tubular body 63 in the axial direction toward the other end of the tubular body 63 in the axial direction. Further, the elastic engagement stop 64 is structured such as to be engaged with the housing 51 so as to freely engage and disengage by engaging a protruding stop 64A provided in a protruding manner in a leading end of the elastic engagement stop 64 between a pair of front and rear engagement protruding portions 51A and 51B in both sides of the housing 51 of the optical plug 50 (refer to FIGS. 19A and 19B).

As shown in FIG. 16C, since the switch outline portion 33A of the connection detecting device 31 is arranged reversely in the front-back direction, the switch lever 33 for detecting connection is arranged in a state in which the switch lever 33 is directed toward a diagonally rearward direction from the lower face end portion, and the leading end of the switch lever 33 is faced to the rectangular incision-shaped notch concave portion 38 of each of both the front and rear fitting portions of the optical adapter 60. When the optical plug 50 is fully inserted into the fitting portion of the optical adapter 60 in the state in which the optical plug 50 is not the half insertion state, the coupling 53 pushes up the switch lever 33 of the connection detecting device 31 to the switch-on state, and the lighting color indicating the on state is displayed on the light emission display portion 32 in the front face (refer to FIGS. 19A and 19B). For example, at the connection finishing time that the optical plug 50 is fully inserted into the fitting portion of the optical adapter 60 instead of being in the half-inserted state, the switch lever 33 is pushed up to the switch-on state, and the "green" lighting color indicating the on state is displayed on the light emission display portion 32 in the front face. In the meantime, in the half-inserted state at the non-connected time, the switch lever 33 stays in the pushed-down switch-off state, and the "red" lighting color indicating the off state is displayed on the light emission display portion 32 in the front face (may be turned off the light or may be blinked). By viewing the light emission display portion 32 from the front face as mentioned above, it is possible to simultaneously confirm whether or not the optical plugs 50 inserted into the fitting portions in both ends of the optical adapter 60 are in the half-inserted state.

As shown in FIGS. 16A and 16B, before the insertion of the optical plug 50 into the optical adapter 60, the leading end of the switch lever 33 is arranged in a state in which the leading end is inclined downward to the rearward direction in relation to the fitting opening portion within the notch concave portion 38 of the optical adapter 60.

As shown in FIGS. 17A and 17B, when the protruding stop 64A in the leading end of the elastic engagement stop 64 comes into contact with the engagement protruding portion 51A in the forward side, the switch lever 33 of the connection detecting device 31 is not pushed up yet by the coupling 53, and stays in the switch-off state, and the light emission display portion 32 in the front face is in the half-inserted state in which the "red" lighting color indicating the off state stays displaying (may be turned off the light or may be blinked).

As shown in FIGS. 18A and 18B, when the optical plug 50 reaches an optical reference surface position within the optical adapter 60, the leading end of the coupling 53 is pushed by the protruding stop 64A in the leading end of the elastic engagement stop 64 against the elastic biasing force of the spring 56 to the forward direction of the optical plug 50 and the coupling 53 is somewhat retracted rearward, so that the engagement protruding portion 51A (a catch portion) in the front side of the housing 51 is partly exposed. At this time, the protruding stop 64A in the inner surface of the leading end of the elastic engagement stop 64 runs on the engagement protruding portion 51A (the catch portion). Even in this state, the switch lever 33 of the connection detecting device 31 is not pushed up yet by the coupling 53, and stays in the switch-off state, and the light emission display portion 32 in the front face is in the half-inserted state in which the "red" lighting color indicating the off state stays displaying (may be turned off the light or may be blinked).

As shown in FIGS. 19A and 19B, at the fitting completion position, the protruding stop 64A eats into and is locked to a recess between the front and rear engagement protruding portions 51A and 51B at same time that the protruding stop 64A in the inner surface of the leading end of the elastic engagement stop 64 gets over the engagement protruding portion 51A (the catch portion) in the rearward direction. At the same time, the coupling 53 slides forward on the basis of the forward elastic biasing by the spring 56, and the leading end of the coupling 53 pushes up the switch lever 33 of the connection detecting device 31 to the switch-on state, so that the "green" lighting color indicating the on state is displayed in the light emission display portion 32 in the front face. As a result, it is possible to securely confirm with the front face view that the optical plug 50 is not in the half-inserted state in relation to the connector hole 62 of the optical adapter 60.

<Connection Detecting Mechanism of MU-Type Optical Connector>

Next, a description will be given in detail of an example in which the connection detecting mechanism according to the present embodiment is applied to an MU-type optical connector plug with reference to FIG. 20 to FIG. 23. For information, the structure of the connection detecting device 31 and the internal structure (the switch unit 33C, the female side contact spring 33F and the male side contact spring 33E) and the like of the switch in the inner portion thereof in the present example are the same as those of the example in which the connection detecting device is applied to the LC-type optical connector plug. Therefore, a detailed description thereof will be omitted or simplified. In this regard, the switch outline portion 33A is structured reversely in the front-back direction as shown in FIG. 20 to FIG. 23 and FIG. 16C, and the leading end of the switch lever 33 is arranged within the notch concave portion 38 of the optical adapter 80 in a state in which the leading end is downward inclined toward the rearward direction (the inner side of the fitting portion) in relation to the fitting opening portion, before the insertion of the optical plug 70 into the optical adapter 80.

Accordingly, the optical plug 70 is an MU-type optical connector plug structured such that a knob 79 is outward installed to an outer side of a plug frame 75 and the plug frame 75 can slide at a desired stroke within the knob 79 in an axial direction.

More specifically, the optical plug 70 is structured such that the plug frame formed into a wide quadrangular shape and a ring 76 made of metal are installed in the axial direction, a rubber holder 77 is coupled to a rear end portion of the ring 76 in the axial direction so as to be integrated, and a ferrule 72 having a fiber inserted into and bonded to a center thereof is inward inserted and arranged at the center thereof via a spring 78 in relation to the ring 76. Further, the knob 79 is outward installed to an outer side of the plug frame 75, and the plug frame 75 is structured such as to be slidable at the desired stroke within the knob 79 in the axial direction (a lateral direction in the drawing).

Further, the optical adapter 80 is structured, as shown in FIG. 20 to FIG. 23, such that a guide tube 83 (having the same structure as the sleeve holder 18 mentioned above) to which the ferrule 72 is fitted is arranged at the center of a housing which is formed into a wide quadrangular tubular shape, a pair of cantilever arm springy locking pieces 84 made of synthetic resin are integrally protruded from inner wall surfaces of the housings 81 at both right and left side positions of the guide tube 83, and locking protruding portions 84A are provided in a protruding manner in inside center portions of the leading ends.

Figure 23:
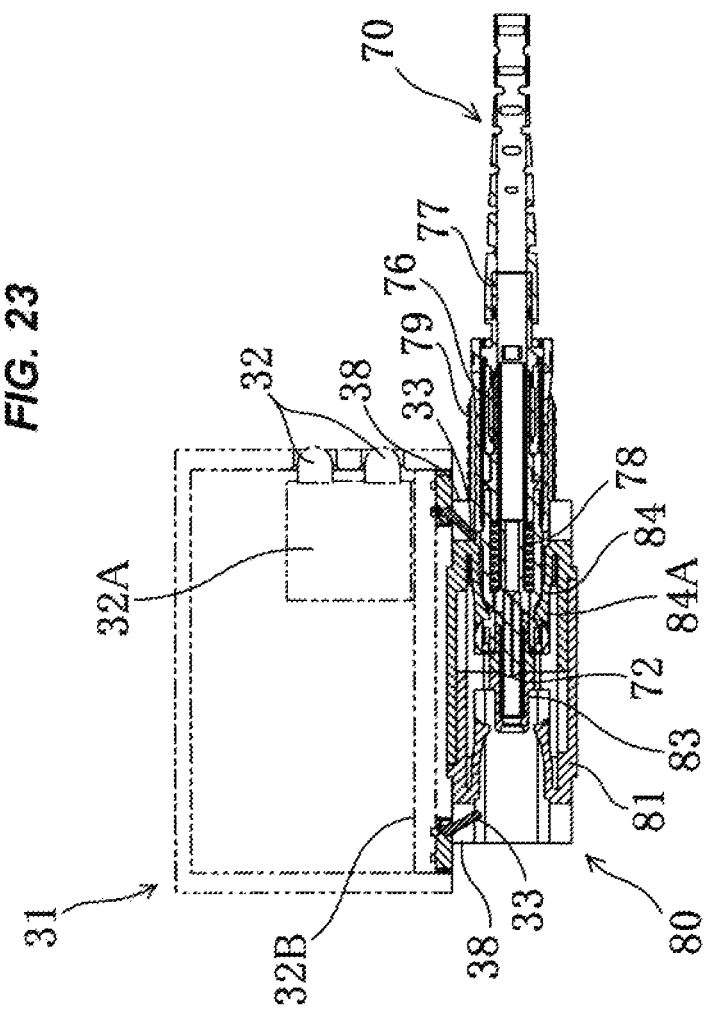

Further, when the optical plug 70 is fully inserted into the optical adapter 80 instead of being in the half-inserted state, and the connection is finished, the knob 79 pushes up the switch lever 33 of the connection detecting device 31 to the switch-on state, and the "green" lighting color indicating the on state is displayed on the light emission display portion 32 in the front face (refer to FIG. 23). In the meantime, in the half-inserted state at the non-connected time, the switch lever 33 stays the switch-off state in which the switch lever 33 is pushed down, and the "red" lighting color indicating the off state is displayed (may be turned off the light or may be blinked) in the light emission display portion 32 in the front face. As a result, it is possible to securely confirm with the front face view that the optical plug 70 is not in the half-inserted state in relation to the guide tube 83 at the center of the housing 81 of the optical adapter 80.

<Connection Detecting Mechanism of SC-Type Optical Connector>

Next, a description will be given in detail of an example in which the connection detecting mechanism according to the present embodiment is applied to an SC-type optical connector plug with reference to FIG. 24A to FIG. 27B. For information, the structure of the connection detecting device 31 and the internal structure (the switch unit 33C, the female side contact spring 33F, the male side contact spring 33E) and the like of the switch outline portion 33A in the inner portion thereof are the same as those of the example in which the connection detecting device 31 is applied to the LC-type optical connector plug. Therefore, a detailed description will be omitted or simplified. In this regard, since the switch outline portion 33A is structured reversely in the front-back direction as shown in FIG. 24A to FIG. 27B, and FIG. 16C, the leading end of the switch lever 33 is arranged within a notch concave portion 38 of an optical adapter 100 in a state in which the leading end is downward inclined toward the rearward direction (the inner side of the fitting portion) in relation to the fitting opening portion, before the insertion of an optical plug 90 into the optical adapter 100.

The optical plug 90 is an SC-type optical connector plug structured such that a ferrule 93 is inward installed to a plug frame 92 within a knob 91.

More specifically, as shown in FIGS. 24A and 24B to FIGS. 27A and 27B, the optical plug 90 is provided with the knob 91, the plug frame 92 which is housed within the knob 91, the ferrule 93 which is housed within the plug frame 92, a spring 94 which is an elastic member for biasing the ferrule 93 in an axial direction, a stopper 95 which is housed within the plug frame 92 and prevents the ferrule 93 from moving in the axial direction, that is, coming away, and a rubber boot 97. Further, a guide projection 98 guided and inserted to the notch concave portion 38 formed at the center of an upper face of the fitting portion in the optical adapter 100 along a direction of optical axis is formed at the center of the upper surface of the knob 91. The switch lever 33 of the connection detecting device 31 is faced to the notch concave portion 38. Further, locking concave portions 99 are formed in right and left side walls of the plug frame 92, and a locking protruding portion 103A in a leading end of the springy locking piece 103 in the optical adapter 100 mentioned later is locked to the locking concave portion 99 at the same time that the ferrule 93 is fitted to a guide tube 102 mentioned later. For information, key grooves (not shown) for introducing the locking protruding portion 103A in the leading end of the springy locking piece 103 are formed in right and left side walls of the knob 91 in correspondence to the locking concave portions 99.

The optical adapter 100 is structured, as shown in FIG. 24B, FIG. 25B, FIG. 26B and FIG. 27B, such that the guide tube 102 (having the same structure as the sleeve holder 19 mentioned above) to which the ferrule 93 is fitted is arranged at the center of the housing 101 which is formed into the wide quadrangular tubular shape, a pair of cantilever arm springy locking pieces 103 made of synthetic resin are integrally protruded from the inner wall surfaces of the housings 101 at both the right and left side positions of the guide tube 102, and the locking protruding portions 103A locked to the locking concave portions 99 of the plug frame 92 via the key groove of the knob 91 are provided in the protruding manner in the inner side of the leading end.

Figure 27A:
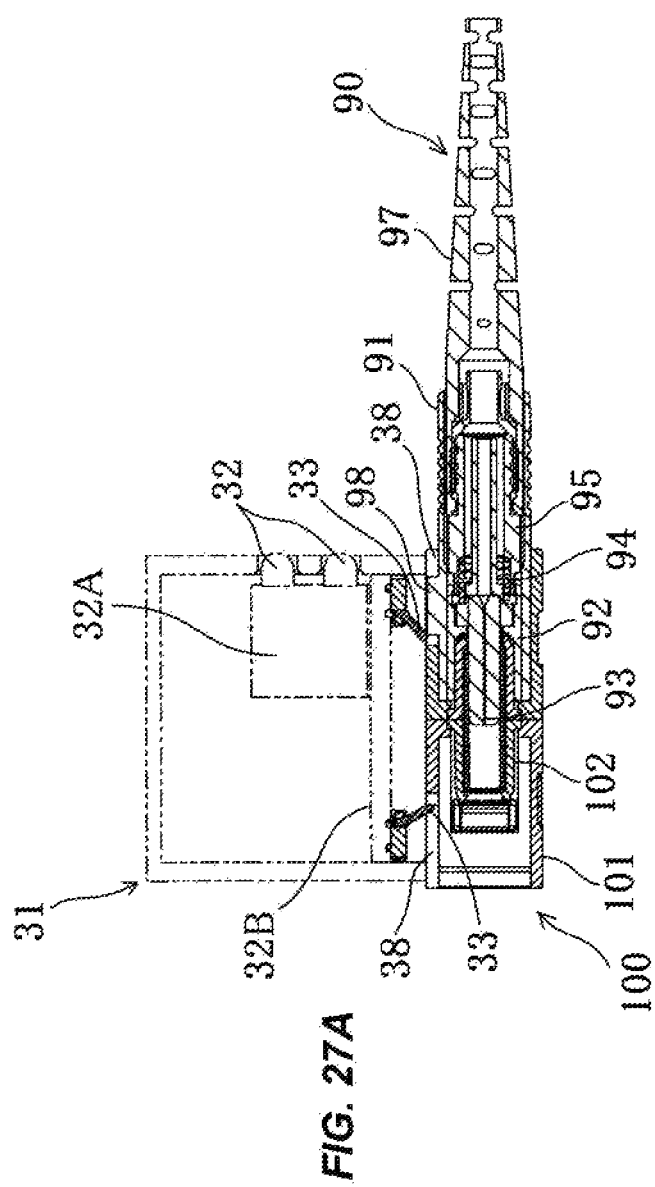
Figure 27B:
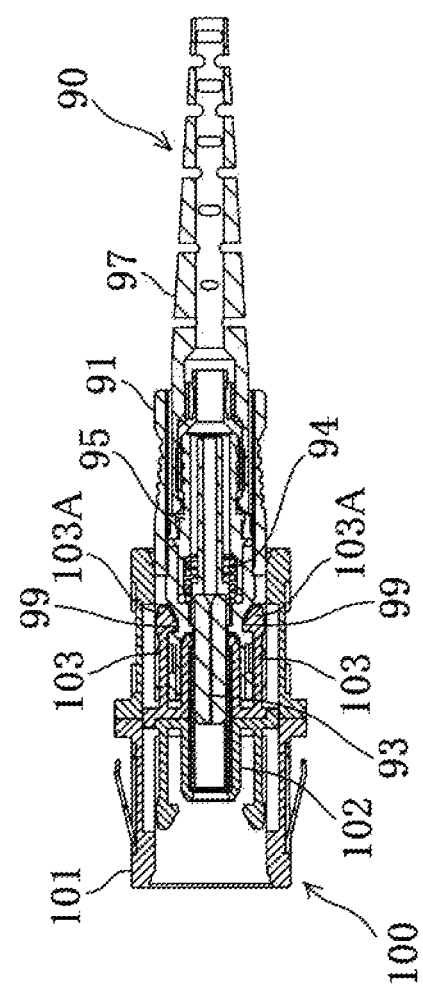

Further, when the optical plug 90 is fully inserted into the fitting portion of the optical adapter 100 instead of being in the half-inserted state, that is, when the guide projection 98 in the upper wall of the knob 91 is fully inserted into the internal depth portion of the notch concave portion 38 at the same time that the ferrule 93 is fitted to the guide tube 102, the switch lever 33 of the connection detecting device 31 faced to the notch concave portion 38 is pulled upward so as to be pushed away by the guide projection 98 to the switch-on state, and the "green" lighting color indicating the on state is displayed in the light emission display portion 32 in the front face (refer to FIG. 27A). In the meantime, in the half-inserted state at the non-connected time, the switch lever 33 stays in the pushed-down switch-off state, and the "red" lighting color indicating the off state is displayed in the light emission display portion 32 in the front face (may be turned off the light or may be blinked). As a result, it is possible to securely confirm with the front face view that the optical plug 90 is fully inserted to the fitting portion of the optical adapter 100 or in the half-inserted state. For information, since the structure of the optical adapter 100 is approximately the same as the case of the optical adapter 100 according to the MPO-type optical connector adapter mentioned above, a detailed description thereof will be omitted.

In addition, in this connection, in each of the examples mentioned above, the lighting color of the light emission display portion 32 in the front face is changed between "green" and "red" (including the light turning off or the light blinking) in correspondence to the on or off state of the switch lever 33. However, the color is not limited to them, but a color combination may be used as long as different colors are used.

The description is given of the connection detecting mechanism according to the LC, MPO, MU or SC-type optical connector device using the optical fiber. However, the present invention can be widely utilized as a connection detecting mechanism of the other electric equipment such as an electric plug outlet and a phone wiring connecting modular jack than the optical fiber.

The invention claimed is:

1. An optical adapter panel, comprising:
a plurality of connection detecting devices each having a front face and a lower face, a light emission display portion provided in the front face for detecting connection and at least one switch lever provided in the lower face for detecting connection; and
a plurality of optical adapters each having opposing ends each having a fitting portion adapted to receive an optical connector plug so that optical axes of two received optical connector plugs coincide with each other, and leading end portions of the two received optical connector plugs meet in a butt joint,
wherein the plurality of optical adapters are arranged and mounted side by side, and the plurality of connection detecting devices are provided in an attaching recess such that each of the connection detecting devices is arranged at an upper side of a corresponding one of the optical adapters, such that the at least one switch lever of each connection detecting device extends from the lower face of the connection detecting device through a notch formed in an upper wall side of an opening end of one of said fitting portions of a corresponding optical adapter;
wherein for each connection detecting device, downward projections are provided in both front and rear ends of the lower face of the connection detecting device, and in each optical adapter hole portions are provided in upper wall sides of opening ends in both the fitting portions of the optical adapter, the projections and the hole portions being formed in such a manner as to position the optical adapter in relation to the connection detecting device by moving downward the connection detecting device in relation to the optical adapter panel in a state in which the connection detecting device is locked by the screw attaching flange portion, and fitting the projections to the hole portions.

2. The optical adapter panel according to claim 1, wherein for each connection detecting device, horizontal guide keys are provided in both right and left side faces of the connection detecting device, a screw attaching flange portion for fixing to the optical adapter panel is provided at a position which is away from the guide keys, and guide grooves for inserting the guide keys from a forward side of the optical adapter panel are formed at opposing positions of right and left inner edges in the attaching recess of the optical adapter panel.

* * * * *